(12) United States Patent
Kokubun

(10) Patent No.: US 8,879,794 B2
(45) Date of Patent: Nov. 4, 2014

(54) TRACKING-FRAME INITIAL-POSITION SETTING DEVICE AND METHOD OF CONTROLLING OPERATION OF SAME

(71) Applicant: FUJIFILM Corporation, Tokyo (JP)

(72) Inventor: Hideaki Kokubun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/228,954

(22) Filed: Mar. 28, 2014

(65) Prior Publication Data
US 2014/0211997 A1 Jul. 31, 2014

Related U.S. Application Data

(63) Continuation of application No. PCT/JP2012/071843, filed on Aug. 29, 2012.

(30) Foreign Application Priority Data

Sep. 30, 2011 (JP) .................. 2011-216090

(51) Int. Cl.
*G06K 9/00* (2006.01)
*G06T 7/20* (2006.01)
*G06K 9/32* (2006.01)
*G03B 35/08* (2006.01)
*H04N 5/232* (2006.01)
*G06T 7/00* (2006.01)
*G02B 7/36* (2006.01)

(52) U.S. Cl.
CPC ............ *G06T 7/0042* (2013.01); *G06T 7/2033* (2013.01); *G06K 9/32* (2013.01); *G03B 35/08* (2013.01); *G06K 2009/3291* (2013.01); *G06K 9/00234* (2013.01); *G06T 7/20* (2013.01); *H04N 5/23293* (2013.01); *G02B 7/36* (2013.01)
USPC ...................... 382/103; 348/169; 348/208.14

(58) Field of Classification Search
USPC ............. 348/169, 171, 172, 208.14; 382/103
See application file for complete search history.

(56) References Cited

U.S. PATENT DOCUMENTS

| 5,381,173 | A | 1/1995 | Asayama |
| 6,067,114 | A * | 5/2000 | Omata et al. .................. 348/345 |
| 2011/0187869 | A1* | 8/2011 | Kokubun et al. .............. 348/169 |

FOREIGN PATENT DOCUMENTS

| JP | 5-52562 | A | 3/1993 | |
| JP | 08223457 | A * | 8/1996 | ............. H04N 5/225 |

(Continued)

OTHER PUBLICATIONS

International Search Report issued in PCT/JP2012/071843, mailed on Nov. 27, 2012.

(Continued)

*Primary Examiner* — Gregory F Cunningham
(74) *Attorney, Agent, or Firm* — Birch, Stewart, Kolasch & Birch, LLP

(57) ABSTRACT

An image obtained by imaging a subject is displayed and a tracking frame is displayed at the central portion of a display screen. A target area is set surrounding the tracking frame and a high-frequency-component image is generated. A distance image indicating the distance to the subject image within an imaging zone is generated. An area, which represents a subject at a distance identical with that of the subject portion specified by the tracking frame displayed at the reference position, is decided upon as a search area. While a moving frame is moved within the search area of the high-frequency-component image, amounts of high-frequency component are calculated. The position of the moving frame at which the calculated amount of high-frequency component is maximized is adopted as the initial position of the tracking frame.

26 Claims, 41 Drawing Sheets

(56) References Cited

FOREIGN PATENT DOCUMENTS

| | | |
|---|---|---|
| JP | 9-243904 A | 9/1997 |
| JP | 2001-111882 A | 4/2001 |
| JP | 2005-114588 A | 4/2005 |
| JP | 2006-184742 A | 7/2006 |
| JP | 2009-111716 A | 5/2009 |
| JP | 2009124565 A * | 6/2009 ............ H04N 5/225 |
| JP | 2011-160062 A | 8/2011 |

OTHER PUBLICATIONS

PCT/ISA/237—Issued in PCT/JP2012/071843, mailed on Nov. 27, 2012.

* cited by examiner

*Fig. 31*
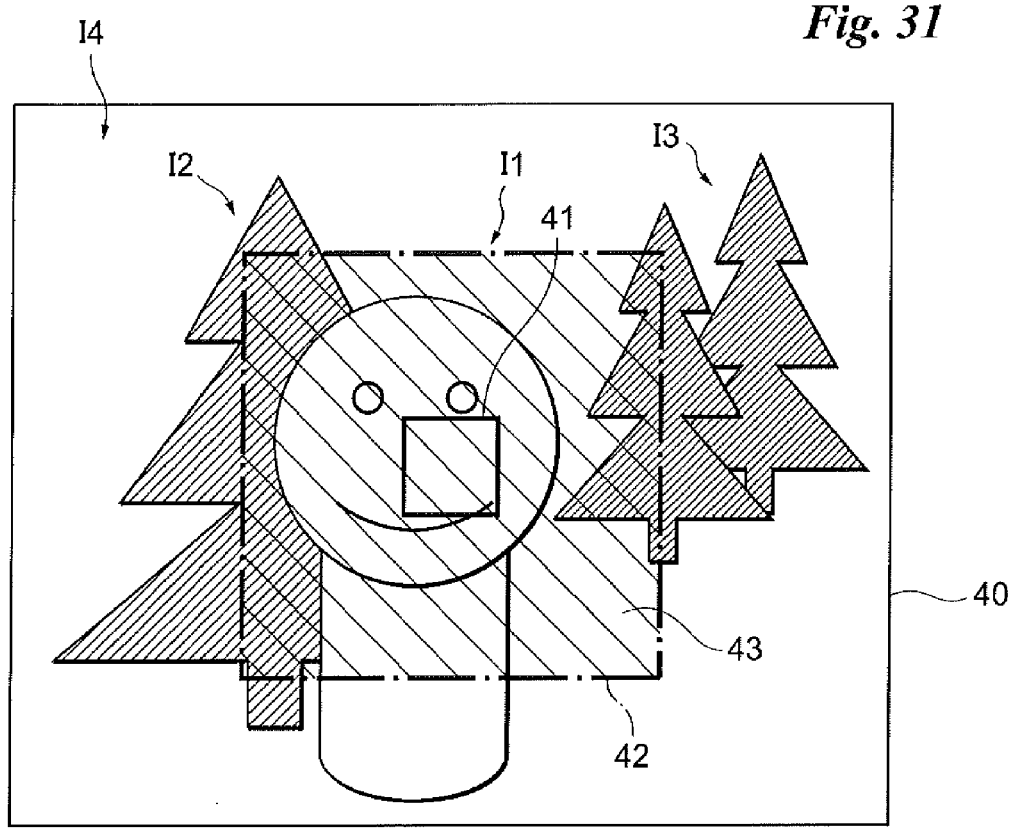
RESIZING OF IMAGE
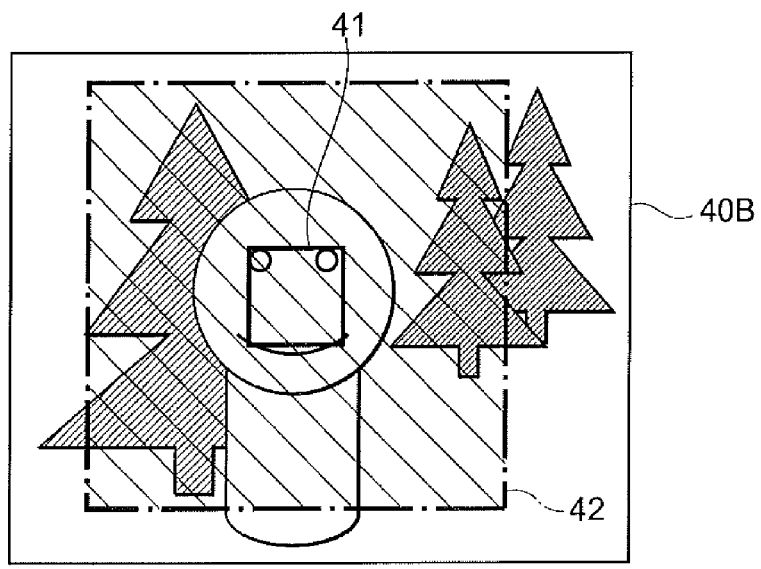

Fig. 39
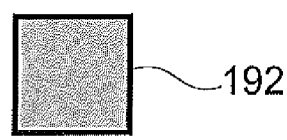

TRACKING-FRAME INITIAL-POSITION SETTING DEVICE AND METHOD OF CONTROLLING OPERATION OF SAME

CROSS REFERENCE TO RELATED APPLICATIONS

This application is a continuation of PCT International Application No. PCT/JP2012/071843 filed on Aug. 29, 2012, which claims priority under 35 U.S.C. 119(a) to Application No. 2011-216090 filed Sep. 30, 2011 in Japan, all of which are hereby expressly incorporated by reference into the present application.

TECHNICAL FIELD

This invention relates to a device for setting the initial position of a tracking frame in a target-image automatic tracking apparatus, and to a method of controlling the operation of this device.

BACKGROUND ART

Digital cameras (inclusive of digital still cameras, digital movie cameras and mobile telephones equipped with a digital camera) include those that track a target image. For example, there is one that sets multiple windows within a display screen, measures distance for every window and performs tracking based upon the measured values (Patent Document 1), one that detects an object to be tracked by comparing an image captured now and the image captured last (Patent Document 2), and one that performs tracking by changing, in accordance with distance and shooting-lens focal distance and the like, the size of a zone that captures, as a reference pattern, the image of a target subject to be tracked (Patent Document 3).

In a case where a target image is tracked, it is necessary to set the target image. Often the setting of the target image is performed by having the user designate the target image. However, when an attempt is made to designate a featureless, difficult-to-track image, tracking is difficult to carry out. For this reason, there is system that decides the initial position of a tracking frame (Patent Document 4).

[Patent Documents]

[Patent Document 1]: Japanese Patent Application Laid-Open No. 5-52562

[Patent Document 2]: Japanese Patent Application Laid-Open No. 2005-114588

[Patent Document 3]: Japanese Patent Application Laid-Open No. 2006-184742

[Patent Document 4]: Japanese Patent Application Laid-Open No. 2011-160062

With the arrangement described in Patent Document 1, something at a short distance is always selected when a tracking window is set. In a case where an object is on this side of the target, therefore, the object cannot be tracked. With the arrangement described in Patent Document 2, an object is assumed to be one whose central portion projects forward, with the result that an object other than such an object tends not to be tracked. With the arrangement described in Patent Document 3, the setting of the tracking target is left up to the user. In a case where the user sets a featureless portion as the target, therefore, there are instances where it cannot be tracked. Furthermore, with the arrangement described in Patent Document 4, the initial position of a tracking frame is decided within a target area for setting the initial position of the tracking frame. If the target area is large, however, it takes time to decide the initial position of the tracking frame.

DISCLOSURE OF THE INVENTION

An object of the present invention is to arrange it so that, when the initial position of a tracking frame is decided so as to facilitate the tracking of a target image, the initial position can be decided in a comparatively short period of time.

The present invention provides a tracking-frame initial-position setting device for specifying a target image, which is to be tracked, contained in a subject image obtained by imaging a subject continuously, characterized by comprising: a display unit for displaying a subject image obtained by imaging; a distance information generating device (distance information generating means) for generating distance information representing distance to a subject contained in an imaging zone or a distance value which is a value corresponding to this distance; a tracking target decision device (tracking target decision means) for deciding a target image to be tracked; and a decision device (decision means) for calculating an amount of high-frequency component per prescribed area in an image portion, which is within the subject image obtained by imaging, representing a subject having a distance value (which may be regarded essentially as being the same as distance) identical with a value of distance to the subject represented by the target image to be tracked decided by the tracking target decision device, and deciding that the position of an area in which the calculated amount of high-frequency component is equal to or greater than a prescribed threshold value or is maximum is the initial position of the tracking frame.

The present invention also provides an operation control method suited to the tracking-frame initial-position setting device described above. Specifically, the present invention provides a method of controlling operation of a tracking-frame initial-position setting device, comprising: a display unit displaying a subject image obtained by imaging; a distance information generating device generating distance information representing distance to a subject contained in an imaging zone or a distance value which is a value corresponding to this distance; a tracking target decision device for deciding a target image to be tracked; and a decision device calculating an amount of high-frequency component per prescribed area in an image portion, which is within the subject image obtained by imaging, representing a subject having a distance value identical with a value of distance to a subject represented by the target image to be tracked decided by the tracking target decision device, and deciding that the position of an area in which the calculated amount of high-frequency component is equal to or greater than a prescribed threshold value or is maximum is the initial position of the tracking frame.

In accordance with the present invention, a subject is imaged continuously and a distance image is generated representing the distance to a subject contained in an imaging zone. In a subject image obtained by imaging, a moving frame is moved in an image portion having the same distance as that of a decided target image to be tracked, and the amount of high-frequency component of the image inside the moving frame is calculated whenever the frame is moved. The position of the moving frame at which the calculated amount of high-frequency component is equal to or greater than a predetermined threshold value or is maximum is decided upon as the initial position of the tracking frame. The image at the position of the moving frame at which the amount of high-frequency component is equal to or greater than a prescribed threshold value or is maximum has many edge components and is easy to track. Since this position is the initial position of the tracking frame, tracking is comparatively easy. Moreover, since the moving frame is moved in a comparatively narrow area, namely the image portion having the same distance as that of the decided target image to be tracked, the time needed to decide the initial position of the tracking frame will be short. Although the boundary portion of an image has many high-frequency components, there is no danger that the high-frequency components of the boundary portion of an image will be calculated because the moving frame is moved in the image portion of the same distance.

For example, the distance information generating device generates a distance image as distance information, the distance image being obtained from an amount of horizontal deviation of corresponding pixels between two subject images representing a subject from different viewpoints.

The device may further comprise a specific frequency component amount calculating device (specific frequency component amount calculating means) for moving a moving frame, in which is calculated an amount of high-frequency component of an image within the frame whenever the frame is moved in an image portion, which is within the subject image obtained by imaging, representing a subject having a distance value identical with a value of distance to a subject represented by the target image to be tracked decided by the tracking target decision device, and calculating the amount of high-frequency component of the image within the moving frame whenever the moving frame is moved. In this case, the decision device would decide a position of the moving frame at which the amount of high-frequency component calculated by the specific frequency component amount calculating device is equal to or greater than a prescribed threshold value or is maximum is the initial position of the tracking frame.

For example, the decides that the target image to be tracked is an image designated by a user, an image of maximum area in an image portion representing an identical distance value in the distance information generated by the distance information generating device, an image of an area that includes the center of the imaging zone, or an image of an area representing a subject situated most forward.

The subject image obtained by imaging a subject continuously is, for example, a color image. In this case, the device further comprises a color component amount calculating device (color component amount calculating means) for calculating amount of component of a prescribed color component per the prescribed area, and the decision device decides that the position of an area where the amount of component calculated by the color component amount calculating device is equal to or greater than a prescribed threshold value or is maximum is the initial position of the tracking frame.

The device may further comprise a first control device (first control means) for controlling the decision device so as to calculate the amount of high-frequency component upon enlarging the size of the prescribed area in response to the amount of high-frequency component calculated by the specific frequency component amount calculating device failing to equal or exceed the prescribed threshold value.

The device may further comprise a first control device (first control means) for controlling the color component amount calculating device so as to execute processing, which is for calculating the amount of color component, upon enlarging the size of the prescribed area in response to the amount of color component calculated by the color component amount calculating device failing to equal or exceed the prescribed threshold value.

The device may further comprise an enlargement command device (enlargement command means) for applying a prescribed-area enlargement command. In this case, by way of example, the first control device would control the decision device so as to calculate the amount of high-frequency component upon enlarging the size of the prescribed area in response to the enlargement command being applied from the enlargement command device and, moreover, the amount of high-frequency component calculated by the specific frequency component amount calculating device failing to equal or exceed the prescribed threshold value.

The device may further comprise an enlargement command device (enlargement command means) for applying a prescribed-area enlargement command. In this case, by way of example, the first control device would control the color frequency component amount calculating device so as to execute processing, which is for calculating the amount of color component, upon enlarging the size of the prescribed area in response to the enlargement command being applied from the enlargement command device and, moreover, the amount of color component calculated by the color component amount calculating device failing to equal or exceed the prescribed threshold value.

The device may further comprise enlargement ratio setting device for setting an enlargement ratio of a prescribed area. In this case, by way of example, the first control device controls the decision device so as to calculate the amount of high-frequency component upon enlarging the size of the prescribed area in accordance with the enlargement ratio, which has been set by the enlargement ratio setting device, in response to the amount of high-frequency component calculated in the decision device failing to equal or exceed the prescribed threshold value.

The device may further comprise an enlargement ratio setting device (enlargement ratio setting means) for setting an enlargement ratio of a prescribed area. In this case, by way of example, the first control device controls the color component amount calculating device so as to execute processing, which is for calculating the amount of color component, upon enlarging the size of the prescribed area in accordance with the enlargement ratio, which has been set by the enlargement ratio setting device, in response to the amount of color component calculated by the color component calculating device failing to equal or exceed the prescribed threshold value.

The device may further comprise a second control device (second control means) for controlling the decision device so as to calculate the amount of high-frequency component upon reducing size of the subject image in response to the amount of high-frequency component calculated in the decision device failing to equal or exceed the prescribed threshold value.

The device may further comprise a third control device (third control means) for controlling the color component amount calculating device so as to execute processing, which is for calculating the amount of color component, upon reducing size of the subject image in response to the amount of color component calculated in the color component amount calculating device failing to exceed the prescribed threshold value.

The device may further comprise a first notification device (first notification means) for notifying of an error in response to the amount of high-frequency component calculated in the decision device failing to equal or exceed the prescribed threshold value.

The device may further comprise a second notification device (second notification means) for notifying of an error in response to the amount of color component calculated by the color component amount calculating device failing to equal or exceed the prescribed threshold value.

For example, the first notification device notifies of an error by a voice output or by a change in form of the display of the moving frame. Further, by way of example, the first notification device notifies of an error by a change in color, type of line or shape of the moving frame, or by a change in method of lighting or flashing the moving frame.

For example, the second notification device notifies of an error by a voice output or by a change in form of the display of the moving frame. Further, by way of example, the second notification device notifies of an error by a change in color, type of line or shape of the moving frame, or by a change in method of lighting or flashing the moving frame.

The device may further comprise a target area setting device (target area setting mean) for setting a target area having a size larger than a prescribed area and smaller than the subject image. In this case, for example, the tracking target decision device decides upon a target image, which is to be tracked within, the target area set by the target area setting device.

For example, the target area setting device sets the target area on the subject image in such a manner that the center of the subject image will coincide with the center of the target area, and, for example, the specific frequency component amount calculating device moves the moving frame outward from the center of the target area and calculates the amount of high-frequency component of the image within the moving frame whenever the moving frame is moved.

For example, the target area setting device sets the target area on the subject image in such a manner that the center of the subject image will coincide with the center of the target area, and, for example, the color component amount calculating device moves the moving frame outward from the reference position and calculates the amount of component of the prescribed color component of the image within the moving frame whenever the moving frame is moved.

For example, the specific frequency component amount calculating device moves the moving frame and calculates amount of low-frequency component, or amount of intermediate-frequency component from which high-frequency components have been eliminated, of the image within the moving frame whenever the moving frame is moved, and the decision device decides that a position of the moving frame at which the amount of low-frequency component or amount of intermediate-frequency component calculated by the specific frequency component amount calculating device is equal to or greater than a prescribed threshold value is the initial position of the tracking frame.

The device may further comprise a noise reduction processing device (noise reduction processing means) for applying noise reduction processing to image data representing the subject image. In this case, the subject image represented by the image data that has been subjected to the noise reduction processing by the noise reduction processing device would be subjected to processing by the decision device.

The device may further comprise a signal processing device (signal processing means) for applying false-color or false-signal reduction processing to the image data representing the subject image. In this case, the subject image represented by the image data that has been subjected to the false-color or false-signal reduction processing by the signal processing device would be subjected to processing by the decision device.

The device may further comprise a halt commanding device (halt commanding means) for applying a command that halts processing for deciding the initial position of the tracking frame, by way of example. In this case, in response to application of the halt command from the halt commanding device, processing by the decision device is halted and the reference position is decided upon as the initial position of the tracking frame.

For example, the specific frequency component amount calculating device moves the moving frame in such a manner that a proportion of inclusion of an image portion, which is within the subject image obtained by imaging, having a distance value identical with that of the target image to be tracked decided by the tracking target decision device will be equal to or greater than a prescribed portion within the frame, and calculates the amount of high-frequency component of the image within the moving frame whenever the moving frame is moved.

The device may further comprise a mode setting device (mode setting means) for setting a maximum-value priority setting mode or a center priority setting mode. In this case, in response to the maximum-value priority setting mode being set by the mode setting device, the decision device would decide that the position of the moving frame at which the amount of high-frequency component calculated by the specific frequency component amount calculating device is maximized is the initial position of the tracking frame, and in response to the center priority setting mode being set by the mode setting device, the frequency component amount calculating device would move the moving frame outwardly from the center of the subject image, calculate the amount of high-frequency component of the image within the moving frame whenever the moving frame is moved, and halt movement of the moving frame in response to the calculated amount of high-frequency component equaling or exceeding a prescribed threshold value.

The device may further comprise a tracking device (tracking means) for moving the tracking frame to an image portion, which is the subject image obtained by imaging, identical with an image portion within the tracking frame in an image portion at a distance value identical with distance to a subject represented by an image portion within the tracking frame at a position decided by the decision device.

The device may further comprise a first display control device (first display control means) for controlling the display unit so as to display the tracking frame at the position decided by the tracking target decision device.

The device may further comprise an offset amount calculating device (offset amount calculating means) for calculating an offset amount representing amount of positional deviation between the initial position of the tracking frame decided by the decision device and the position decided by the tracking target decision device; and a second display control device (second display control means) for controlling the display unit so as to display a display frame at a position that has been offset from the tracking frame, which is used in tracking by the tracking device, by the offset amount calculated by the offset amount calculating device.

BRIEF DESCRIPTION OF THE DRAWINGS

FIG. 31 is an example of a subject image;

FIG. 39 is an example of a template image and distance information;

BEST MODE FOR CARRYING OUT THE INVENTION

Figure 1:
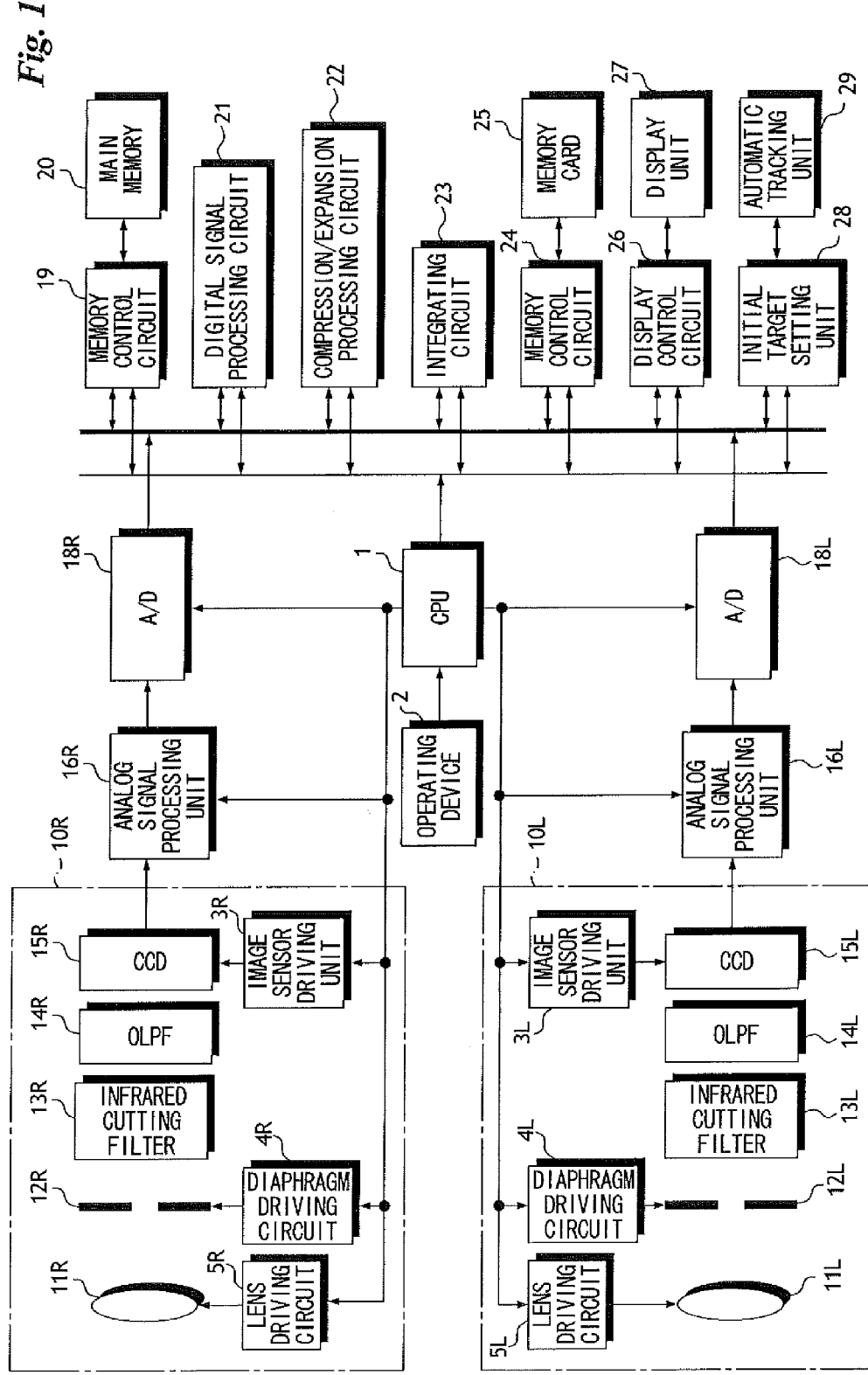
FIG. 1 is a block diagram illustrating the electrical configuration of a digital still camera.

FIG. 1, which shows an embodiment of the present invention, is a block diagram illustrating the electrical configuration of a digital still camera.

It goes without saying that embodiments of the present invention are not limited to a digital still camera but are also applicable to a digital movie video camera.

The digital still camera according to this embodiment is a so-called compound-eye digital still camera and includes a first imaging unit 10R for capturing a right-viewpoint image observed by the right eye and a second imaging unit 10L for capturing a left-viewpoint image observed by the left eye. In this embodiment, as will be described in detail later, a distance image is generated, the distance image representing distance from a right-eye viewpoint image and a left-eye viewpoint image to a subject. The initial position of a tracking frame for tracking a desired subject is decided utilizing the distance image. Naturally, since it will suffice if a distance image is generated, a compound-eye digital still camera need not necessarily be utilized and it may be arranged to utilize a so-called single-eye digital still camera that includes one imaging unit.

The overall operation of the digital still camera is controlled by a CPU 1.

The digital still camera includes an operating device 2. The operating device 2 includes a power button, a mode setting dial, a two-step stroke-type shutter-release button and the like. An operation signal that is output from the operating device 2 is input to the CPU 1. Modes set by the mode setting dial include modes such as an imaging mode and a playback mode.

As mentioned above, the digital still camera includes the first imaging unit 10R and the second imaging unit 10L.

The first imaging unit 10R includes a first CCD 15R for capturing an image from the right-eye viewpoint. A first imaging lens 11R, a first iris 12R, a first infrared cutting filter 13R and a first optical low-pass filter 14R are provided in front of the CCD 15R. The first imaging lens 11R is positioned by a first lens driving circuit 5R and the aperture of the first iris 12R is controlled by a first iris driving circuit 4R. The first CCD 15R is driven by a first image sensor driving circuit 3R.

When the imaging mode is set, light rays representing the image of a subject are collected by the first imaging lens 11R and impinge upon the photoreceptor surface of the first CCD 15R via the first iris 12R, the first infrared cutting filter 13R and first optical low-pass filter 14R. The image of the subject is formed on the photoreceptor surface of the first CCD 15R and an analog video signal representing the right-eye viewpoint image of the subject is output from the first CCD 15R. Thus, the subject is imaged at a fixed period by the first CCD 15R and a video signal representing the image of the subject at the fixed period is output from the first CCD 15R one frame at a time.

A first analog signal processing unit 16R includes a correlated double sampling circuit and a signal amplifying circuit and the like. An analog video signal that has been output from the first CCD 15R is input to the first analog signal processing unit 16R and is subjected to such processing as correlated double sampling and signal amplification. The analog signal that has been output from the first analog signal processing unit 16R is input to a first analog/digital converting circuit 18R and is converted to right-eye viewpoint digital image data. The digital image data obtained by the conversion is stored temporarily in a main memory 20 under the control of a memory control circuit 19.

The second imaging unit 10R includes a second CCD 15L for capturing an image from the left-eye viewpoint. A second imaging lens 11L, a second iris 12L, a second infrared cutting filter 13L and a second optical low-pass filter 14L are provided in front of the CCD 15L. The second imaging lens 11L is positioned by a second lens driving circuit 5L and the aperture of the second iris 12L is controlled by a second iris driving circuit 4L. The second CCD 15L is driven by a second image sensor driving circuit 3L.

When the imaging mode is set, the image of the subject is formed on the photoreceptor surface of the second CCD 15L and an analog video signal representing the left-eye viewpoint image of the subject is output from the second CCD 15L in a manner similar to that of the first imaging unit 10R. Thus, the subject is imaged at a fixed period by the second CCD 15L and a video signal representing the image of the subject at the fixed period is output from the second CCD 15L one frame at a time.

An analog video signal that has been output from the second CCD 15L is input to the second analog signal processing unit 16L and is subjected to such processing as correlated double sampling and signal amplification. The analog signal that has been output from the second analog signal processing unit 16L is input to a second analog/digital converting circuit 18L and is converted to left-eye viewpoint digital image data. The digital image data obtained by the conversion is stored temporarily in the main memory 20 under the control of the memory control circuit 19.

The items of right-eye viewpoint image data and left-eye viewpoint image data are read out of the main memory 20 and are input to a digital signal processing circuit 21. The digital signal processing circuit 21 executes prescribed digital signal processing such as a white balance adjustment and a gamma correction. The image data that has been subjected to digital signal processing in the digital signal processing circuit 21 is applied to a display control circuit 26. A display unit 27 is controlled by the display control circuit 26, whereby the image of the subject obtained by imaging is displayed stereoscopically on the display screen of the display unit 27. Naturally, it may be arranged so that either the right-eye viewpoint image or left-eye viewpoint image rather than a stereoscopic image is displayed on the display screen of the display unit 27.

If the shutter-release button is pressed through the first step of its stroke, either one of the items of image data (or both items of the image data) of the items of right-eye viewpoint image data and left-eye viewpoint image data that have been output from the first analog/digital converting circuit 18R and second analog/digital converting circuit 18L is recorded in the main memory 20 in the manner described above. Image data that has been read out of the main memory 20 is converted to luminance data in the digital signal processing circuit 21. The luminance data obtained by the conversion is input to an integrating circuit 23 and is integrated. Data representing the integrated value is applied to the CPU 1 and the amount of exposure is calculated. The aperture of the iris 12 and the shutter speed of the CCD 15 are controlled in such a manner that the calculated amount of exposure is attained.

If the shutter-release button is pressed through the second step of its stroke, both of the items of right-eye viewpoint image data and left-eye viewpoint image data that have been output from the first analog/digital converting circuit 18R and second analog/digital converting circuit 18L are recorded in the main memory 20 in the manner described above. Items of right-eye viewpoint image data and left-eye viewpoint image data that have been read out of the main memory 20 are subjected to prescribed digital signal processing in the digital signal processing circuit 21 in a manner similar to that described above. The items of right-eye viewpoint image data and left-eye viewpoint image data that have been output from the digital signal processing circuit 21 are subjected to data compression in a compression/expansion processing circuit 22. The items of right-eye viewpoint image data and left-eye viewpoint image data that have been compressed are recorded on a memory card 25 by control performed by an external-memory control circuit 24.

In this embodiment, a target image contained in the image of a subject can be tracked automatically. By performing automatic tracking, a frame (a tracking frame) can be displayed continuously on a target image contained in a subject image (a moving image) obtained continuously by imaging. Thus imaging can be repeated without losing sight of a specific person. Further, an exposure adjustment can be performed in such a manner that the target image will take on an appropriate brightness, and a focus adjustment can be performed so as to bring the target image into focus.

In a case where the target image is tracked, it is necessary to set the target image (to perform initial target setting). This embodiment is such that if a portion of the target image is designated by the user, a tracking frame is decided using an easy-to-track portion in the vicinity of the designated portion as the target image. Tracking thus becomes comparatively easy.

In order to decide the initial position of the tracking frame, the digital still camera includes an initial target setting unit 28. A tracking frame set by the initial target setting unit 28 is displayed on the display screen of the display unit 27. The image within the tracking frame set in the initial target setting unit 28 is adopted as the target image and the target image is tracked by an automatic tracking unit 29. The digital signal processing circuit 21 incorporates a noise reduction filter, a false-color reduction filter and a false-signal reduction filter. Image data that has been subjected to noise reduction, false-color reduction and false-signal reduction in the digital signal processing circuit 21 is input to the initial target setting unit 28, where processing described later is executed.

When the playback mode is set, the compressed image data that has been recorded on the memory card 25 is read. The compressed image data read is expanded in the compression/expansion processing circuit 22. By applying the expanded image data to the display control circuit 26, the reproduced image is displayed on the display screen of the display unit 27. It may be so arranged that the above-described automatic tracking is performed not only at the time of recording but also at playback.

Figure 2:
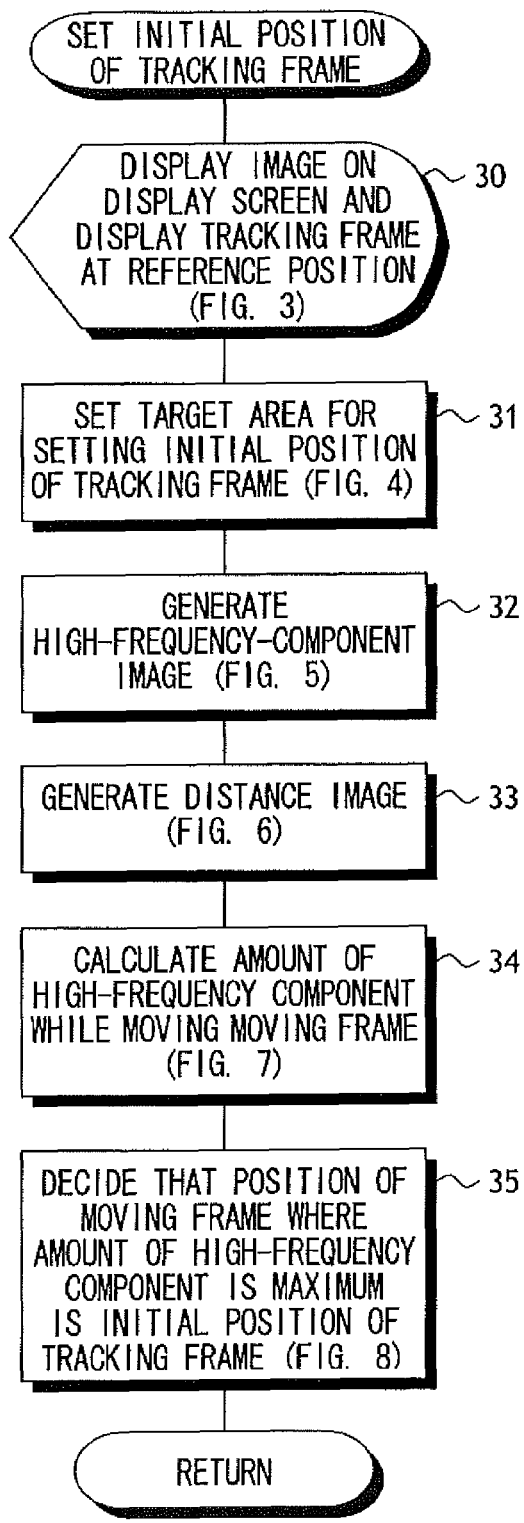
FIG. 2 is a flowchart illustrating a processing procedure for setting the initial position of a tracking frame.
Figure 6:
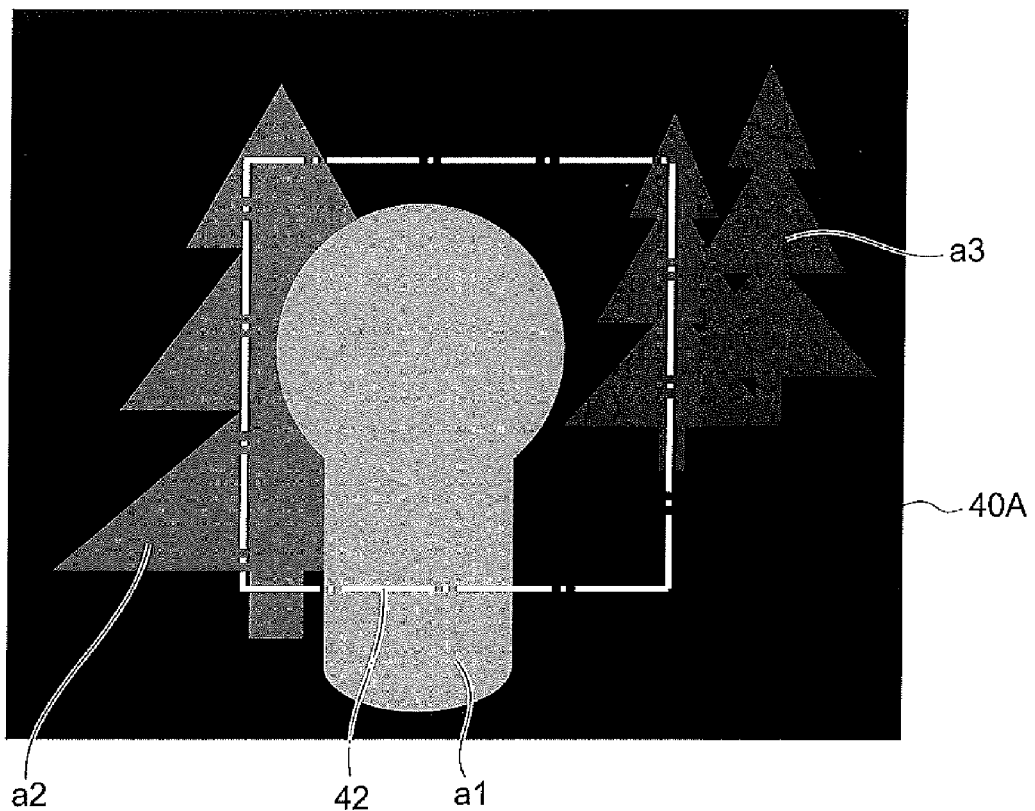
FIG. 6 is an example of a distance image.
Figure 7:
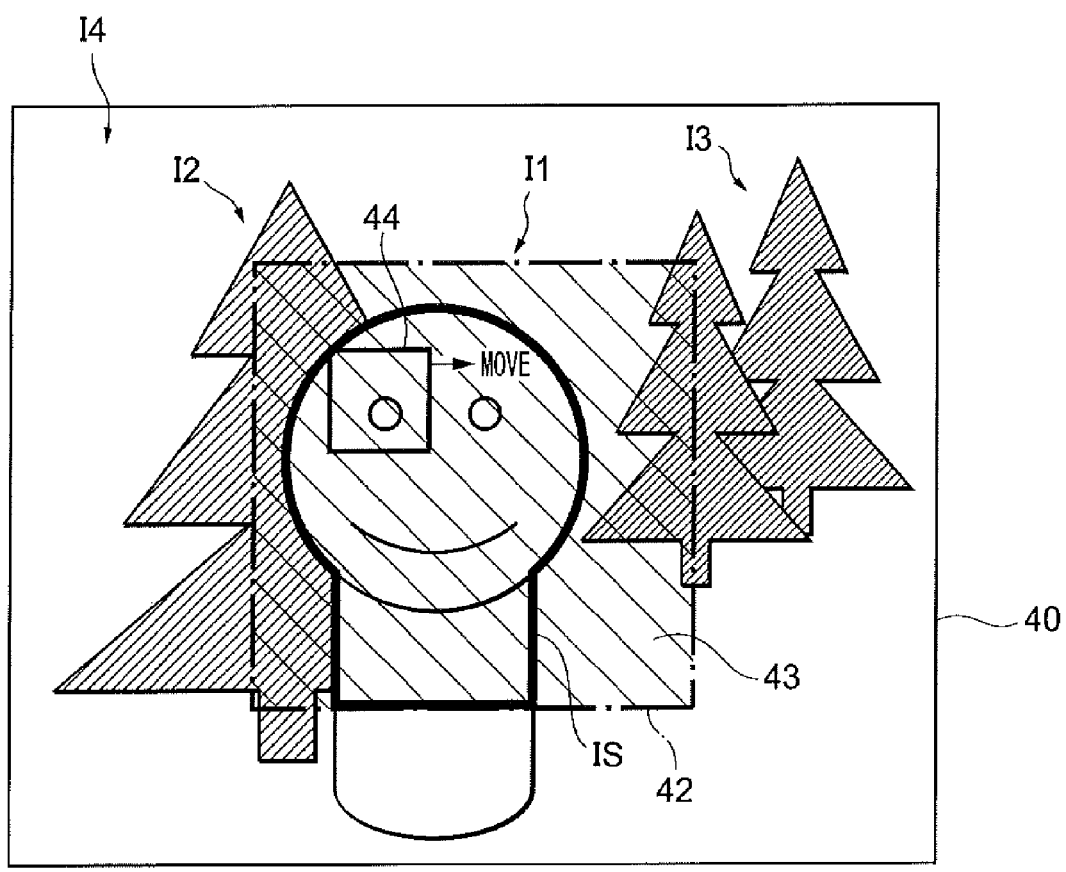
FIG. 7 is an example of a subject image.
Figure 8:
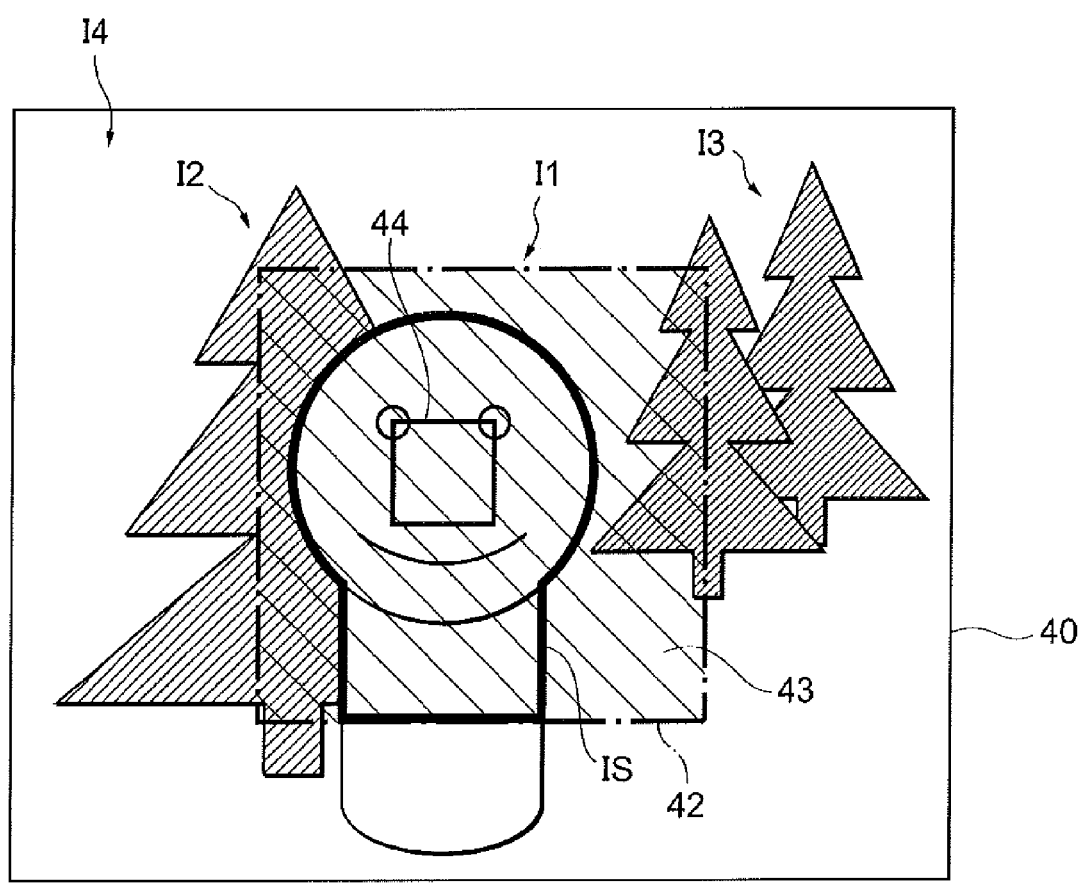
FIG. 8 is an example of a subject image.

FIG. 2 is a flowchart illustrating a processing procedure for setting the initial position of the tracking frame. FIGS. 3 to 5 and FIGS. 7 and 8 are examples of images displayed on the display screen of the display unit 27. FIG. 6 is an example of a distance image. An image 40 shown in FIGS. 3 to 5 and in FIGS. 7 and 8 is one subject image 40 constituting a number of frames of images obtained by imaging a subject continuously at a fixed period by setting the imaging mode, as described above.

When the imaging mode is set, a subject is imaged at a fixed period and the image of the subject is displayed as a moving image (a so-called "through-the-lens image") on the display screen of the display unit 27 as described above. A tracking frame 41 is displayed at a reference position, which is the central portion of the display screen of display unit 27 (step 30). (The reference position need not necessarily be the central portion, and there may be a plurality thereof.)

Figure 3:
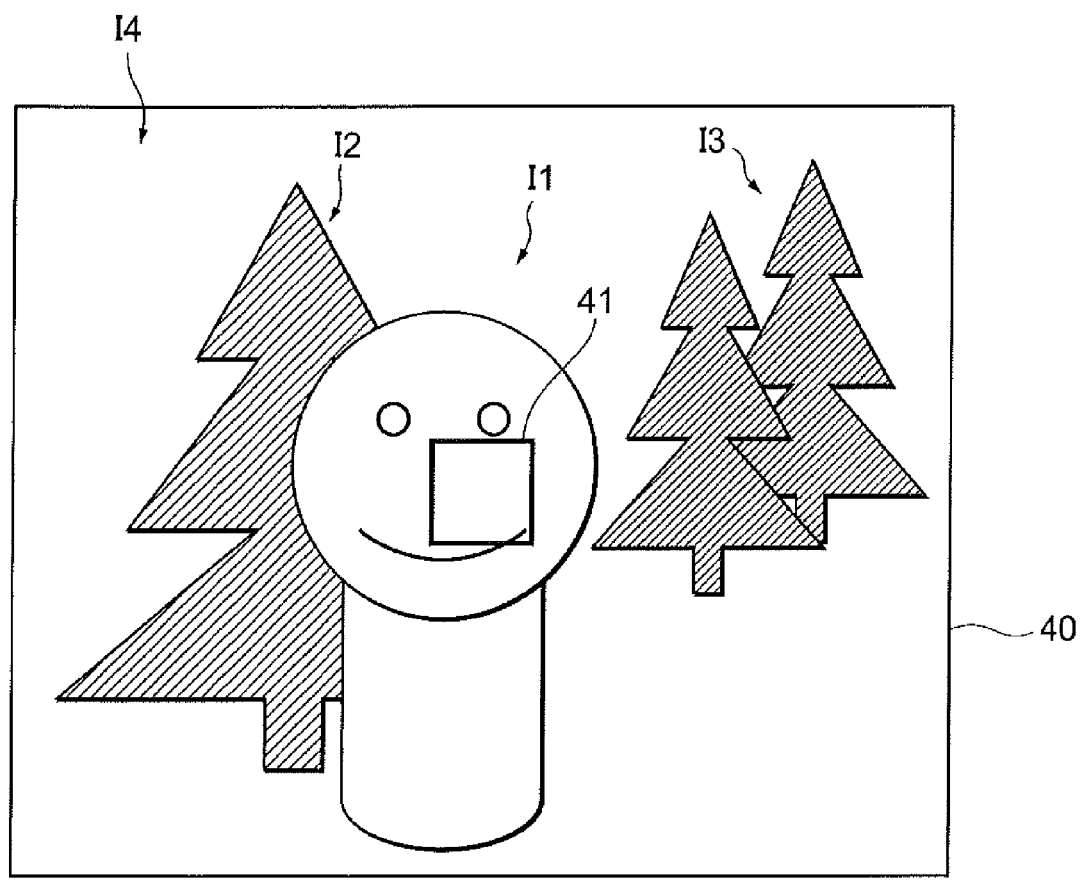
FIG. 3 is an example of a subject image.

FIG. 3 illustrates the manner in which the tracking frame 41 is displayed at the reference position.

The subject image 40 obtained by imaging the subject is being displayed on the display screen of the display unit 27. The subject image 40 contains a person image I1, a first tree image I2, a second tree image I3 and a background image I4. The person represented by the person image I1 is closest to the digital still camera, and the tree represented by the first tree image I2 is the next closest to the digital still camera. The tree represented by the second tree image I3 is farther away from the digital still camera than is the tree represented by the first tree image I2. The background represented by the background image I4 is the farthest away from the digital still camera. The rectangular tracking frame 41 of prescribed size is being displayed at the reference position at the central portion of the display screen. The shape of the tracking frame 41 is not limited to a rectangular shape and may be of another shape. Further, a person, a face or the like may be recognized and the shape of the person or face recognized may be adopted as the tracking frame.

The cameraman decides the camera angle in such a manner that a target image desired to be tracked falls within the tracking frame 41. If at least a portion of the target image falls within the tracking frame 41, the cameraman presses the shutter-release button through the first step of its stroke (applies a command that starts processing for deciding the initial position of the tracking frame). When this is done, a target area for setting the initial position of the tracking frame is set outside the tracking frame 41 (step 31 in FIG. 2). Naturally, it may be so arranged that the processing of step 30 for displaying the tracking frame is executed by pressing the shutter-release button through the first step of its stroke. Further, the command for starting processing for deciding the initial position of the tracking frame may be applied to the digital still camera from another special-purpose button or switch rather than by pressing the shutter-release button through the first step of its stroke.

Figure 4:
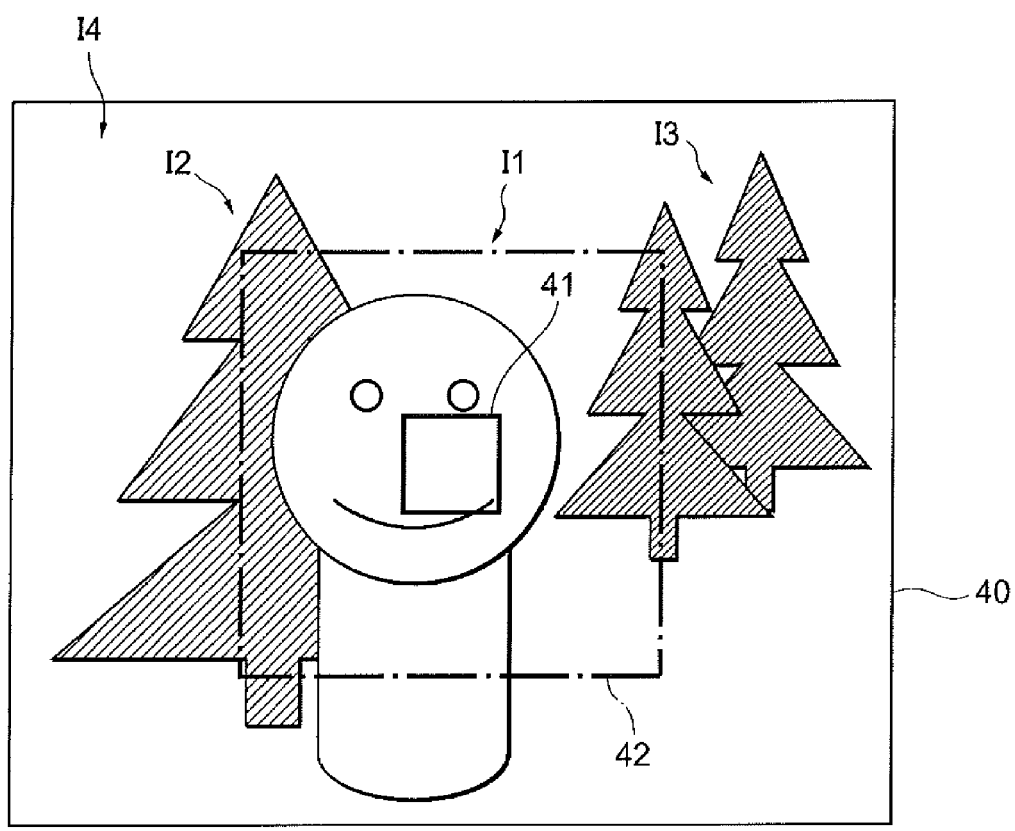
FIG. 4 is an example of a subject image.

FIG. 4 illustrates how a target area for setting the initial position of the tracking frame has been set on the image 40.

A target area 42 for setting the initial position of the tracking frame has as its center the center of the display screen, has a size larger than that of the tracking frame 41 and smaller than that of the subject image (display screen) 40, and contains the tracking frame 41. In FIG. 4, although a phantom line is indicated so that the target area 42 for setting the initial position of the tracking frame can be understood, the target area 42 for setting the initial position of the tracking frame need not necessarily be displayed on the display screen. Naturally, the area 42 itself need not be provided.

When the target area 42 for setting the initial position of the tracking frame is set, a high-frequency-component image is generated by extracting high-frequency components of the target image contained in the area 42 (step 32 in FIG. 2).

Figure 5:
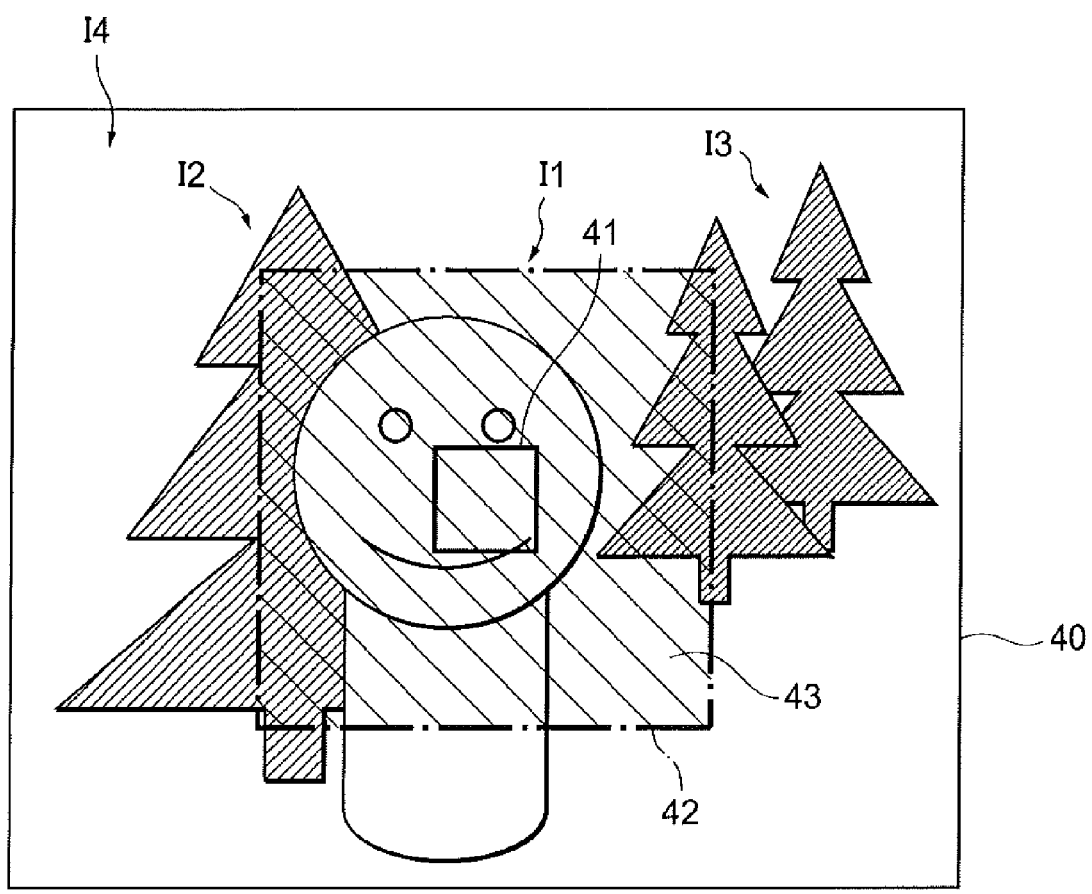
FIG. 5 is an example of a subject image.

FIG. 5 illustrates the manner in which high-frequency components have been extracted from the image contained in the target area 42, which is for setting the initial position of the tracking frame, to thereby generate a high-frequency-component image.

A high-frequency-component image 43 generated by extracting high-frequency components from the image within the area 42 is displayed within the area 42. In order to indicate that the image within the area 42 is the image 43 composed of high-frequency components, the image 43 is hatched. In a case where there is no area 42, a high-frequency-component image is extracted from the entirety of the image 40.

Next, a distance image is generated (step 33 in FIG. 2).

FIG. 6 is an example of a distance image 40A.

The distance image 40A represents the distance to a subject contained in the subject image 40. In FIG. 6, distance from the digital still camera to the subject is expressed in the form of density. The lower the density, the shorter the distance from the digital still camera, and the higher the density, the longer the distance from the digital still camera.

The distance image 40A contains areas a1, a2, a3 and a4 that correspond respectively to the person image I1, first tree image I2, second tree image I3 and background image I4 contained in the above-described subject image 40. Since the person represented by the person image I1, the tree represented by the first tree image I2, the tree represented by the second tree image I3 and the background represented by background image I4 have increasingly greater distances from the digital still camera in the order mentioned, as set forth above, the areas, a1, a2, a3 and a4 increase in density in the order mentioned.

The target area 42 for setting the initial position of the tracking frame also is illustrated in FIG. 6 so that its relationship to the subject image 40 may be understood.

Adopted as a search area is an image portion which falls within the generated high-frequency-component image 43 and, moreover, which represents a subject at a distance identical with the distance to a subject represented by an image on which the tracking frame 41 has been set, and a moving frame having the same shape and same size as those of the tracking frame 41 is set inside this search area. While the moving frame is moved one pixel at a time in the horizontal and vertical directions within the search area, the amount of high-frequency component is calculated (step 34 in FIG. 2). In a case where there are multiple image portions which fall within the generated high-frequency-component image 43 and, moreover, which represent a subject at a distance identical with the distance to a subject represented by an image on which the tracking frame 41 has been set, the image portion among these multiple image portions that has the largest area is adopted as the search area.

FIG. 7 illustrates the manner in which a moving frame 44 is displayed.

As mentioned above, the moving frame 44, which has the same shape as that of the tracking frame 41 (although the shape need not be the same) and the same size (although the size need not be the same), is set within the high-frequency-component image 43. The moving frame 44 may or may not be displayed.

As mentioned above, the tracking frame 41 has been set on the person image I1. In the person image I1, therefore, an area IS (the area IS is surrounded by a bold line) included within the high-frequency-component image 43 serves as a search area IS. The moving frame 44 is moved one pixel at a time horizontally and vertically within the search area IS and, for every position to which the moving frame 44 is moved, a count is taken of the number of those pixels among the pixels contained in the moving frame that have a high-frequency component equal to or greater than a high-frequency component that is equal to or greater than a prescribed threshold value, whereby the amount of high-frequency component (the value of the count) is calculated.

The position of the moving frame 44 at which the amount of high-frequency component is maximum is decided upon as the initial position of the tracking frame 41 (step 35 in FIG. 2).

FIG. 8 illustrates how the initial position of the tracking frame 41 is decided.

In a case where amounts of high-frequency component have been calculated while moving the moving frame 44 within the search area IS in the manner described above, it is assumed that the amount of high-frequency component will be maximum when the moving frame 44 is at the position of the moving frame 44 shown in FIG. 8. When this occurs, the position of the moving frame 44 at this time is decided upon as the initial position of the tracking frame 41.

In the above-described embodiment, the target area 42 for setting the initial position of the tracking frame is set, and adopted as the search area IS is an area which is an image portion representing a subject at a distance identical with the distance to a subject represented by a subject image on which the tracking frame 41 has been set, and, moreover, which is within the target area 42 for setting the initial position of the tracking frame. However, an image portion representing a subject at a distance identical with the distance to a subject represented by a subject image on which the tracking frame 41 has been set may be adopted as the search area IS without setting the target area 42 for setting the initial position of the tracking frame. For example, the area of the person image I1 may serve as the search area IS.

Since the initial position of the tracking frame 41 is decided upon executing processing such as that for calculating amounts of high-frequency component within the search area IS in the manner described above, the initial position of the tracking frame 41 is decided more rapidly in comparison with a case where the initial position of the tracking frame 41 is decided upon executing processing such as that for calculating amounts of high-frequency component in the entire subject image 40 or in the target area 42 for setting the initial position of the tracking frame. Although a portion such as the boundary portion of a subject tends to exhibit the features of an edge component or the like, such boundary portions are excluded from the search area IS by utilizing the distance image 40A. This makes it possible to decide the initial position of the tracking frame 41 appropriately.

When the initial position of the tracking frame 41 is thus decided, the image within the tracking frame 41 is adopted as the target image and tracking processing starts, from this initial position, with regard to the image that is input next. The image within the tracking frame 41 decided as the initial position has the maximum amount of high-frequency component inside the search area IS and the image contains many edges. Tracking processing, therefore is comparatively easy. The image within the tracking frame 41 used in tracking processing may be the image having the extracted high-frequency component or may be the image 40 before the extraction of the high-frequency component.

It goes without saying that the generation of the high-frequency-component image may be performed by including a high-pass filter in the initial-target setting unit and using this high-pass filter to generate the high-frequency-component image. Naturally, some or all of the above-described processing may be executed using hardware, or some or all of the processing may be executed using software.

In the above-described embodiment, the tracking frame is displayed at a reference position at the center of the display screen and the person image I1 that contains the image within the tracking frame is decided upon as the target image. However, in the distance image 40A, the image of a subject represented by the largest area from within an area that excludes background may be adopted as the target image, or, as a matter of course, the image of the subject closest to the digital still camera may be adopted as the target image.

Figure 9:
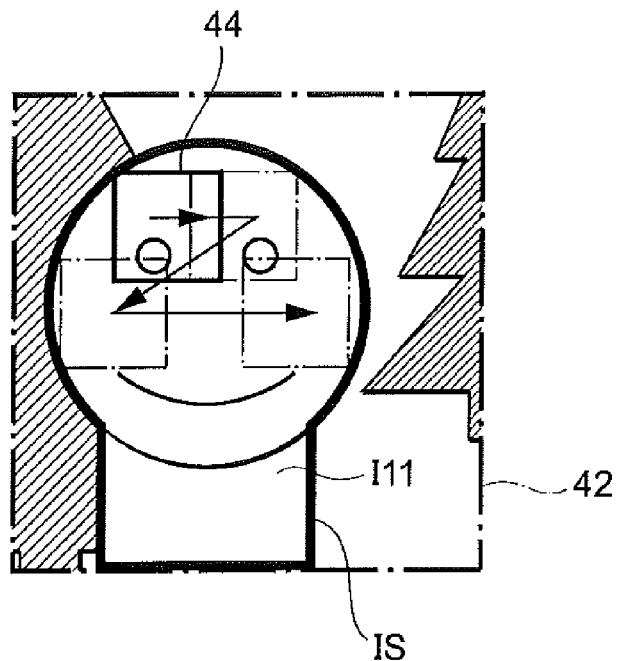
FIG. 9 illustrates a portion of a subject image.
Figure 10:
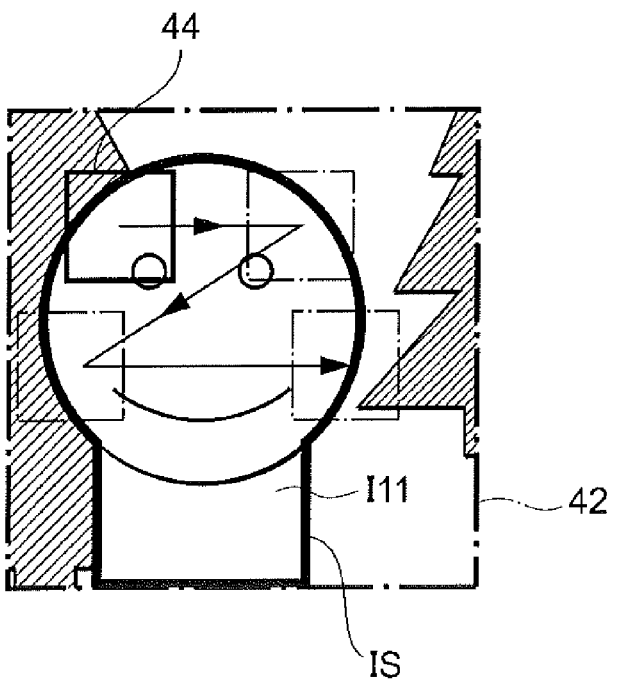
FIG. 10 illustrates a portion of a subject image.

FIGS. 9 and 10 illustrate an image within the target area 42 for setting the initial position of the tracking frame.

With reference to FIG. 9, when the search area IS is set in the manner described above, the moving frame 44 is moved inside the search area IS and, while it is being moved, the amount of high-frequency component is calculated whenever the frame is moved. The moving frame 44 is moved so as not to protrude from the search area IS.

By contrast, in FIG. 10, part of the moving frame 44 is allowed to protrude from the search area IS. The moving frame 44 is moved in such a manner that 50% (or 80%) or more of the area of the moving frame 44 will fall within the search area IS. The amount of high-frequency component is calculated whenever the moving frame 44 is moved, as mentioned above. In a case were the search area IS is narrow, locations where the amount of high-frequency component can be calculated will become fewer if the moving frame 44 is moved so as not to protrude from the search area IS. However, by allowing a part of the moving frame 44 to protrude from the search area IS, locations where the amount of high-frequency component can be calculated increase in number and the initial position of the tracking frame can be decided more accurately.

Figure 11:
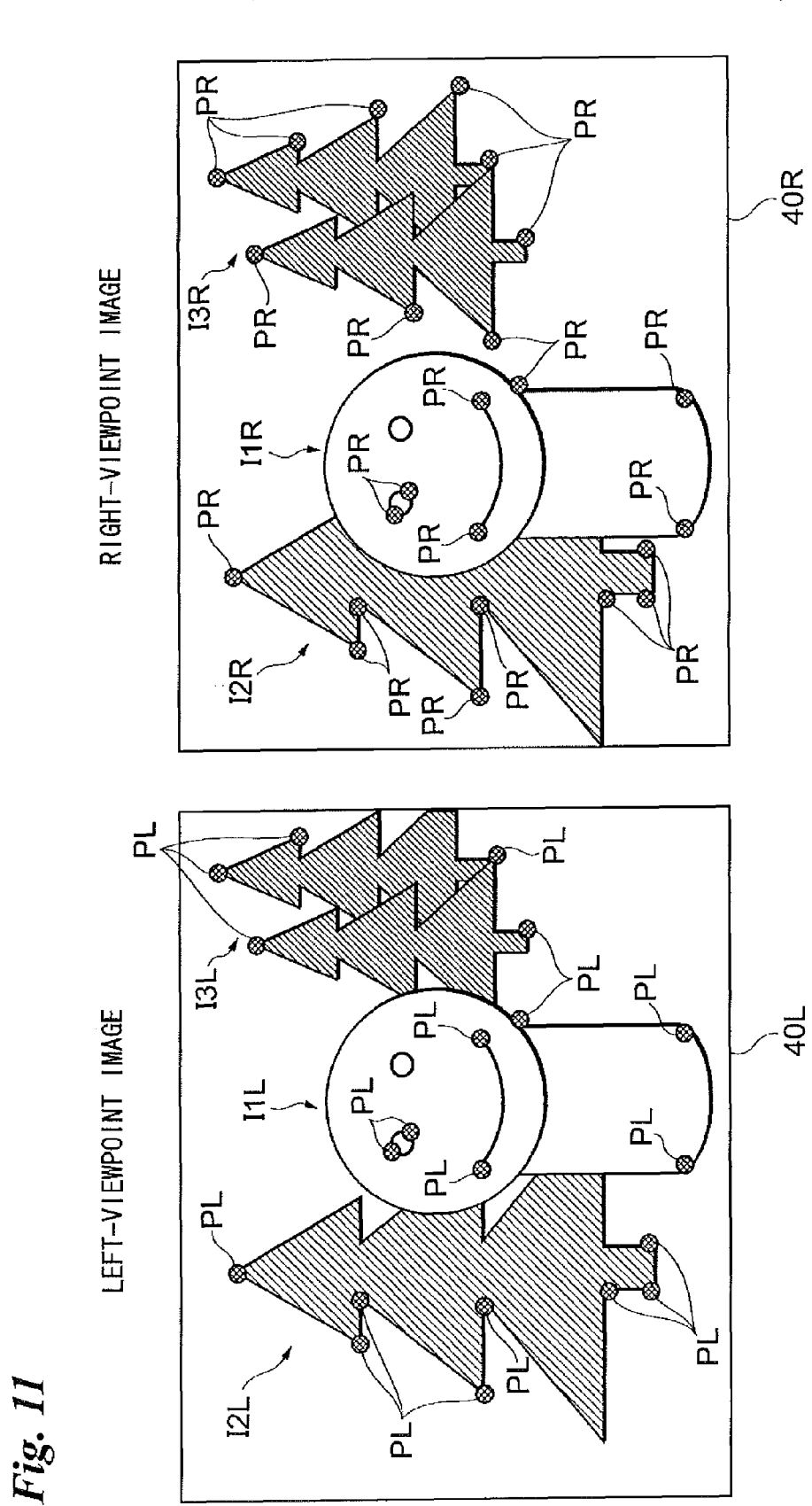
FIG. 11 represents a left-viewpoint image and a right-viewpoint image.

FIG. 11 is an example of a left-viewpoint image 40L and a right-viewpoint image 40R. The left viewpoint image 40L is obtained by the second imaging unit 10L and the right viewpoint image 40R is obtained by the first imaging unit 10R in the manner described above.

The above-mentioned distance image 40A (see FIG. 6) is generated from the left viewpoint image 40L and right viewpoint image 40R.

In order to generate the distance image 40A, feature points PL representing pixels deemed to have high-frequency components are detected from among the pixels that form the left viewpoint image 40L (feature points PR may be detected from the right viewpoint image 40R). Corresponding points PR, which correspond to the feature points PL detected from the left viewpoint image 40L, are detected from the right viewpoint image 40R. The above-described distance image 40A is generated using, as distance information, the length of the horizontal difference between the feature points PL detected from the left viewpoint image 40L and the corresponding points PR detected from the right viewpoint image 40R.

Figure 12:
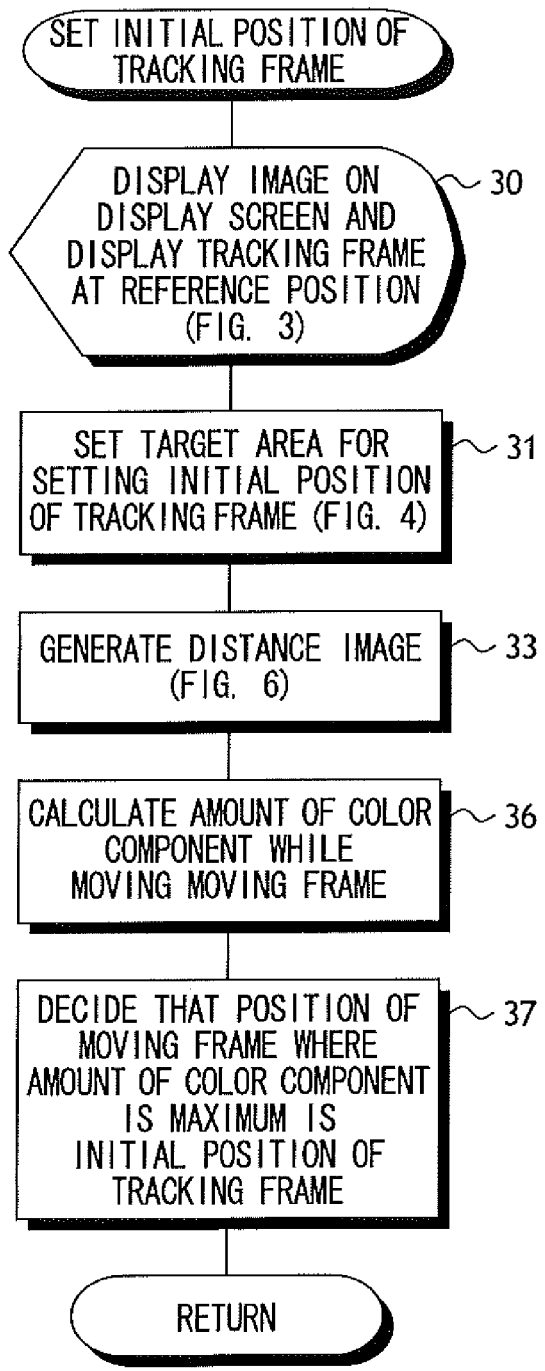
FIG. 12 is a flowchart illustrating a processing procedure for setting the initial position of a tracking frame.

FIG. 12, which shows another embodiment, is a flowchart illustrating a processing procedure for setting the initial position of a tracking frame. FIG. 12 corresponds to FIG. 2 and processing steps shown in FIG. 12 identical with those shown in FIG. 2 are designated by like step numbers and a description thereof is omitted.

In the foregoing embodiment, the position of the moving frame 44 at which the amount of high-frequency component is maximum inside the target area 42 for setting the initial position of the tracking frame is adopted as the initial position of the tracking frame 41. According to the processing shown in FIG. 12, however, the position of the moving frame 44 where the amount of a color component is maximum is adopted as the initial position of the tracking frame 41.

As described above, target area 42 for setting the initial position of the tracking frame is set (step 31) and the distance image is generated (step 33). The search area IS defined, as described above, and the moving frame 44 is moved one pixel at a time up, down, left and right within the search area IS (step 36). At every position to which the moving frame 44 is moved, the number of pixels (amount of color component) of a color component of pixels, which form an image present within the moving frame 44, equal to or greater than a threshold value is calculated (step 36). (The color components are red, green and blue color components. However, the color components may be of other three primary colors such as cyan, magenta and yellow, color differences such as Cr and Cb, or other color components). The position of the moving frame 44 where the calculated amount of color component is maximum is adopted as the initial position of the tracking frame 41 (step 37).

Figure 13:
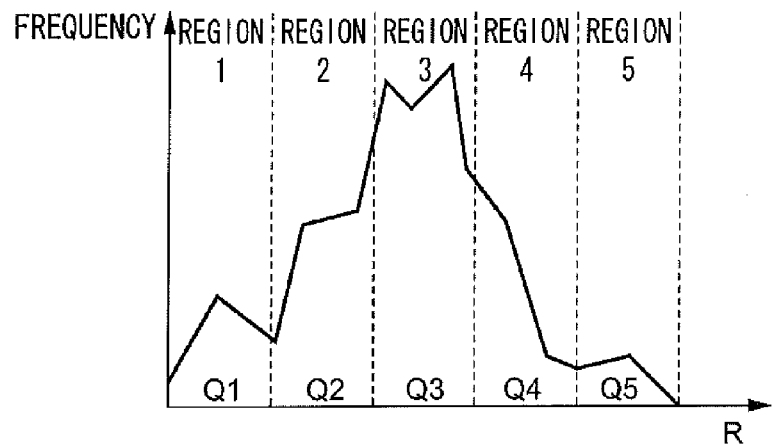
FIG. 13 is an example of color-component histogram.
Figure 14:
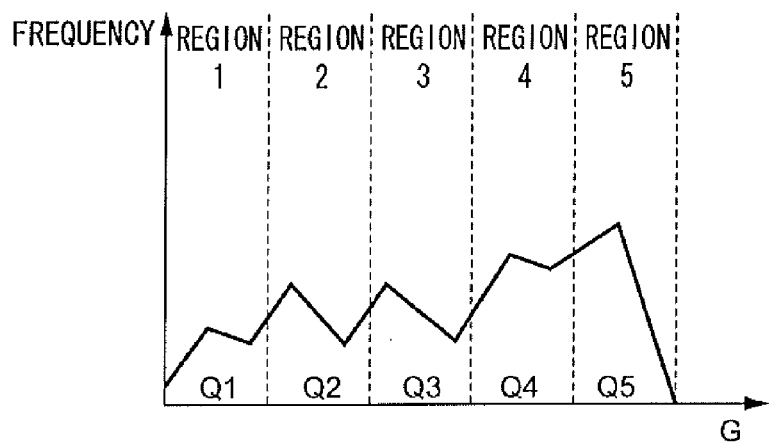
FIG. 14 is an example of color-component histogram.
Figure 15:
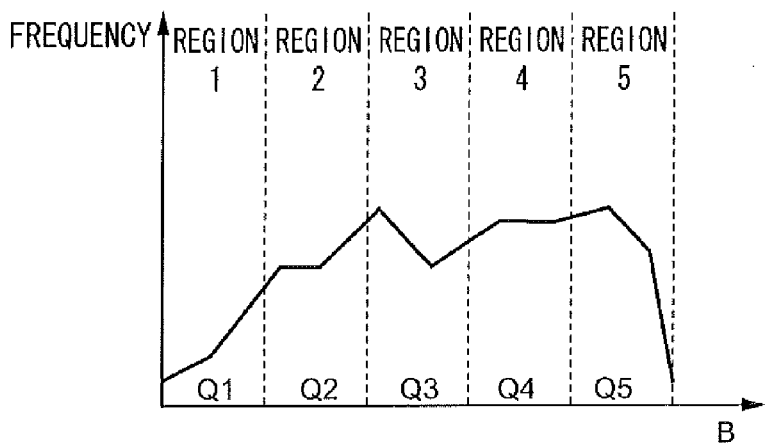
FIG. 15 is an example of color-component histogram.

FIGS. 13 to 15 are examples of color-component histograms. FIG. 13 is a color-component histogram of the red color component, FIG. 14 a color-component histogram of the green color component and FIG. 15 a color-component histogram of the blue color component.

With reference to FIG. 13, it is assumed that amounts Q1 to Q5 of the red color component have been calculated in respective ones of five regions 1 to 5 to which the moving frame 41 has been moved. (Since the moving frame 44 is actually moved one pixel at a time, amounts of the red color component are obtained at many more locations to which the moving frame is moved. For the sake of convenience, however, it is assumed here that the amounts of the color component have been obtained with regard to the regions of the five locations.)

Similarly, with reference to FIG. 14, amounts Q6 to Q10 of the green color component have been calculated in respective ones of the five regions 1 to 5 to which the moving frame 41 has been moved, and with reference to FIG. 15, amounts Q11 to Q15 of the blue color component have been calculated in respective ones of five regions 1 to 5 to which the moving frame 41 has been moved.

Among these amounts Q1 to Q5 of the red color component, amounts Q6 to Q10 of the green color component and amounts Q11 to Q15 of the blue color component, the position of the moving frame 44 at which the amount of color component is maximum is adopted as the initial position of the tracking frame 41. For example, in a case where the amount Q3 of red color component is maximum, the position of region 3 becomes the initial position of the tracking frame 41. Naturally, the position of the moving frame 44 at which the amount of color component is maximum from among the amounts Q1 to Q5 of the red color component, amounts Q6 to Q10 of the green color component and amounts Q11 to Q15 of the blue color component need not be adopted as the initial position of the tracking frame 41. Rather, the color components of the target image designated by the cameraman may be analyzed and the position of the moving frame 44 at which the amount of component of a color component the same as or close to the prevalent color component among the color components contained in the target image is maximum may be adopted as the initial position of the tracking frame 41.

Figure 16:
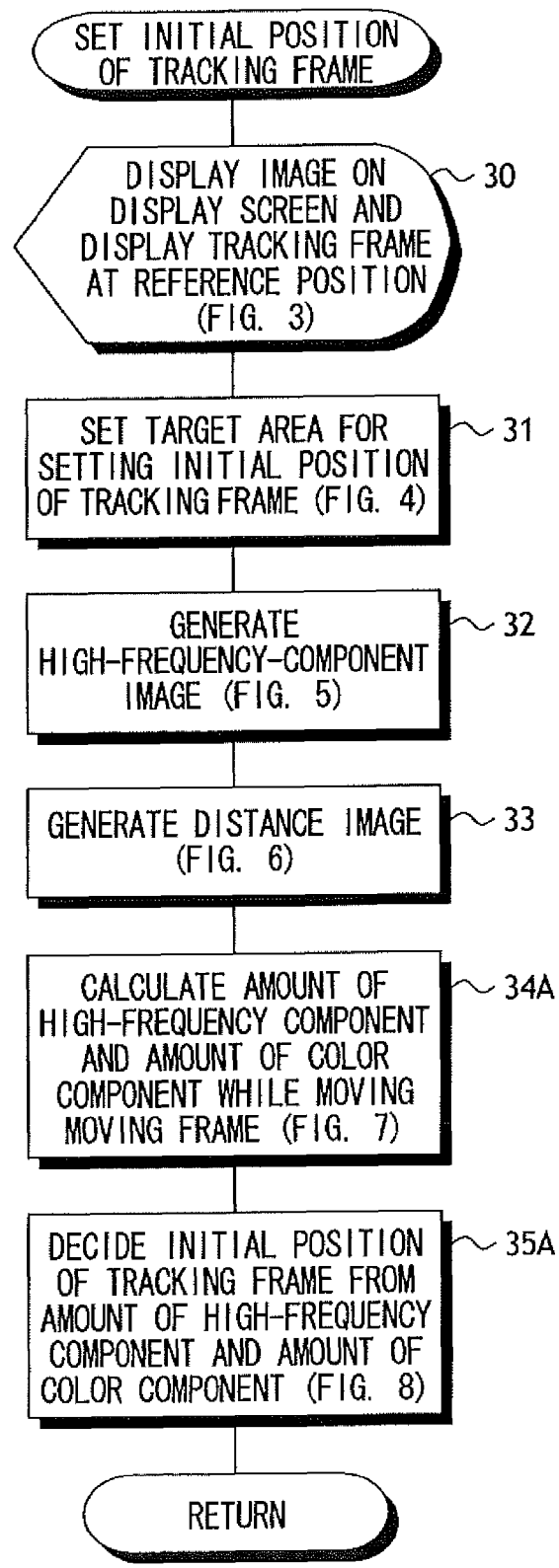
FIG. 16 is a flowchart illustrating a processing procedure for setting the initial position of a tracking frame.

FIG. 16, which shows an embodiment, is a flowchart illustrating a processing procedure for setting the initial position of a tracking frame. Processing steps shown in FIG. 16 identical with those shown in FIG. 12 are designated by like step numbers and a description thereof is omitted.

According to the processing shown in FIG. 12, the position of the moving frame 41 at which the amount of color component is maximum is adopted as the initial position of the tracking frame 44. According to the processing shown in FIG. 16, however, the initial position of the tracking frame 44 is decided using both the amount of high-frequency component and the amount of color component.

A high-frequency-component image is generated from the image within the target area 42 for setting the initial position of the tracking frame (step 32), and then a distance image is generated (step 33), as described above. Then, while the moving frame 41 is being moved within the search area IS, the amount of high-frequency component and the amount of color component are calculated at every position to which the moving frame is moved (step 34A). The initial position of the tracking frame is decided from the calculated amount of high-frequency component and calculated amount of color component (step 35A).

By way of example, the overall amount of component is calculated in accordance with Equation (1) at every position to which the moving frame 41 is moved. The position of the moving frame 41 at which the overall amount of component is maximized is the initial position of the tracking frame. Here w represents a weighting coefficient, e.g., 0.5.

$$\text{overall amount of component} = w \times (\text{amount of high-frequency component}) + (1-w)(\text{amount of color component}) \quad \text{Equation (1)}$$

Figure 17:
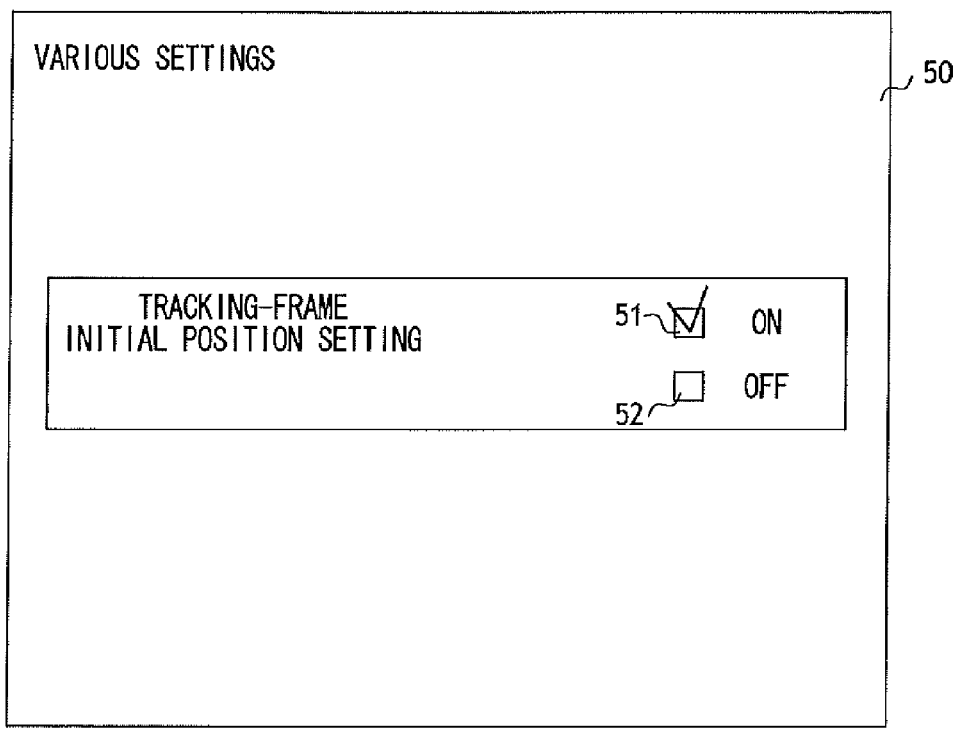
FIG. 17 is an example of a menu image for setting the initial position of a tracking frame.

FIG. 17 is an example of a menu image for setting the initial position of a tracking frame.

If a menu mode is set using a mode setting button on the digital still camera and a menu for setting the initial position of the tracking frame is selected from within the menu mode, a menu image 50 shown in FIG. 17 for setting the initial position of the tracking frame is displayed on the display screen of the display unit 27.

A character string reading "TRACKING-FRAME INITIAL POSITION SETTING" is displayed substantially at the center of the menu image 50 for setting the initial position of the tracking frame. A first check box 51 and a second check box 52 are displayed to the right of this character string. Characters reading "ON" are displayed to the right of the first check box 51, and characters reading "OFF" are displayed to the right of the second check box 52. The operating device 2 includes up, down, left, right buttons for moving a cursor up, down, left and right. Inputting an UP command from the button places a check in the first check box 51, and inputting a DOWN command from the button places a check in the second check box 52.

If the first check box 51 is checked, the digital still camera is set in such a manner that the setting of the initial position of the tracking frame will be carried out in the manner described above. If the second check box 52 is checked, then the digital still camera is set in such a manner that the setting of the initial position of the tracking frame will not be carried out. If the setting of the initial position of the tracking frame is not carried out, automatic tracking processing is executed with the reference position, which is the central portion of the display screen, serving as the initial position of the tracking frame, as set forth earlier.

Figure 18:
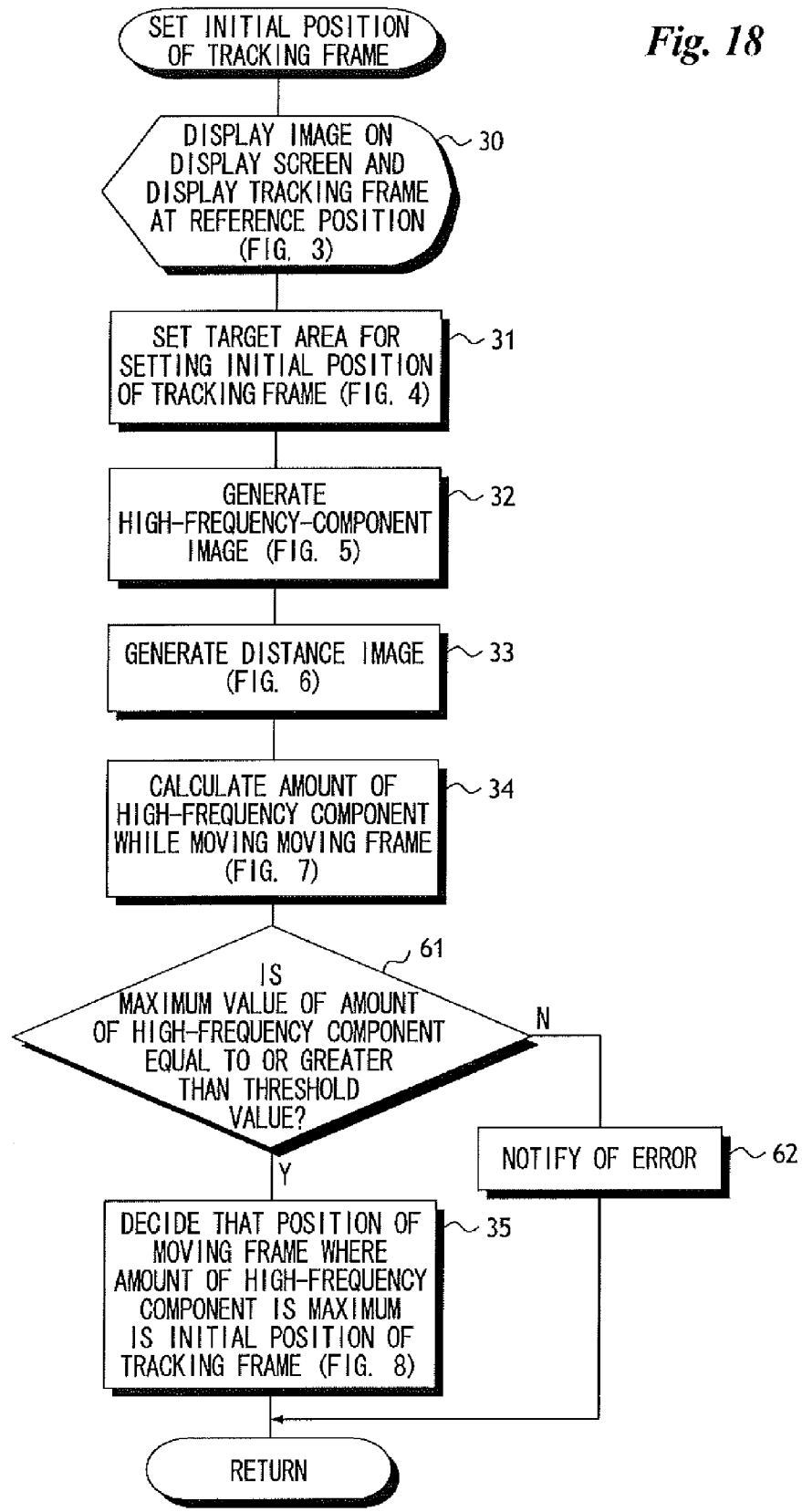
FIG. 18 is a flowchart illustrating a processing procedure for setting the initial position of a tracking frame.
Figure 19:
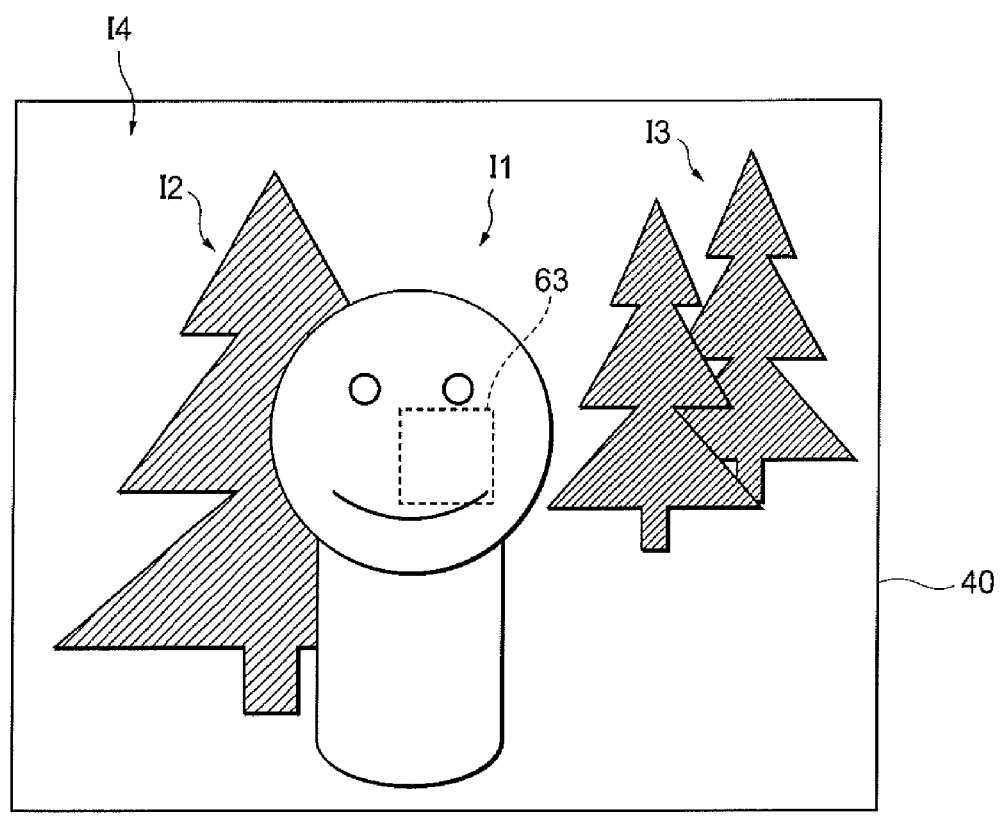
FIG. 19 is an example of a subject image.
Figure 20:
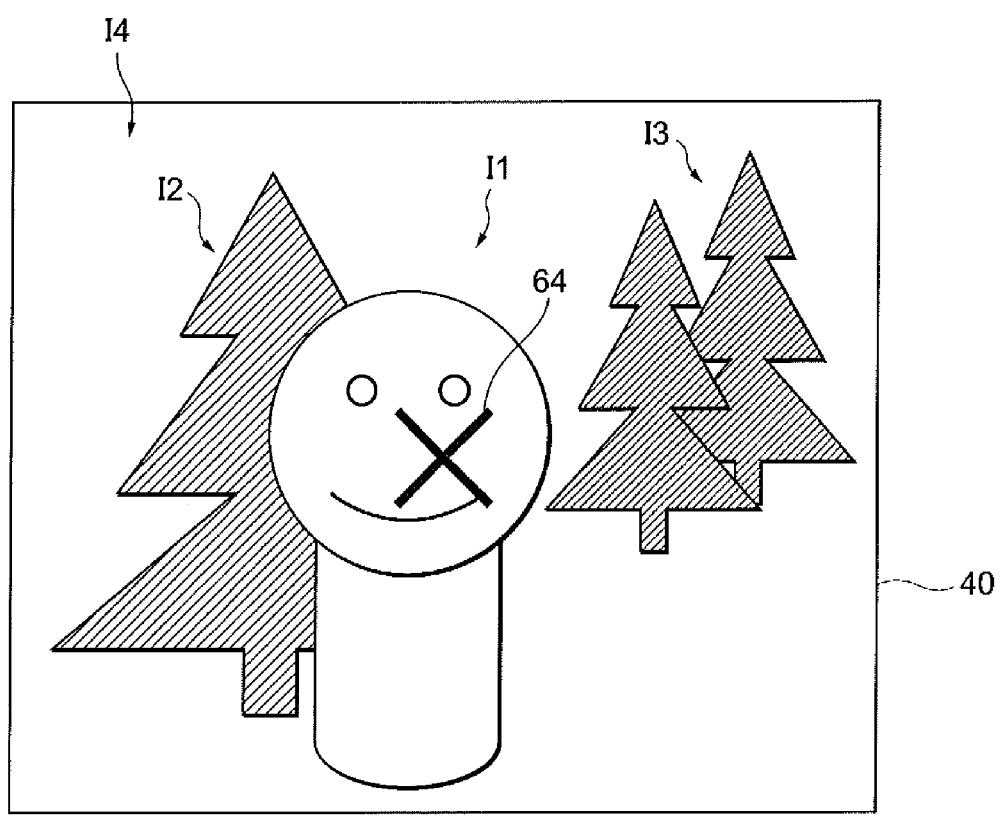
FIG. 20 is an example of a subject image.

FIGS. 18 to 20 illustrate another embodiment of the present invention. FIG. 18 is a flowchart illustrating processing for setting the initial position of the tracking frame 41. Processing steps shown in FIG. 18 identical with those shown in FIG. 2 are designated by like step numbers and a description thereof is omitted.

As mentioned above, the distance image 40A is generated (step 33), moving frame 41 is moved within the search area IS and the amount of high-frequency component is calculated at every position to which the moving frame is moved (step 34). It is determined whether the maximum value of the obtained amount of high-frequency component is equal to or greater than a threshold value (step 61). If the maximum value is equal to or greater than the threshold value ("YES" at step 61), the position of the moving frame 41 at which the amount of high-frequency component is maximum is decided upon as the initial position of the tracking frame 44 (step 35). If the maximum value is not equal to or greater than the threshold value ("NO" at step 61), an error notification is given (step 62).

The error notification may be an output of an error tone or a display indicative of an error. The error notification may be made by presenting the display of the tracking frame 44 in a manner different from that in a case where the initial position has been decided. For example, the color of the tracking frame may be changed. Further, the error notification may be made by making the lighting or flashing of the tracking frame different from that in a case where the initial position of the tracking frame 44 has been decided.

FIGS. 19 and 20 are examples of an image displayed on the display screen in a case where error notification is given.

With reference to FIG. 19, a frame 63 for an error display is being displayed at the central portion of image 40. The frame 63 is a broken line whereas tracking frame 44 is a solid line. By displaying the broken-line frame 63, the photographer can ascertain that an error has occurred.

With reference to FIG. 20, an X-mark 64 for an error display is being displayed at the central portion of image 40. By displaying the X-mark 64, the cameraman can ascertain that an error has occurred.

Figure 21:
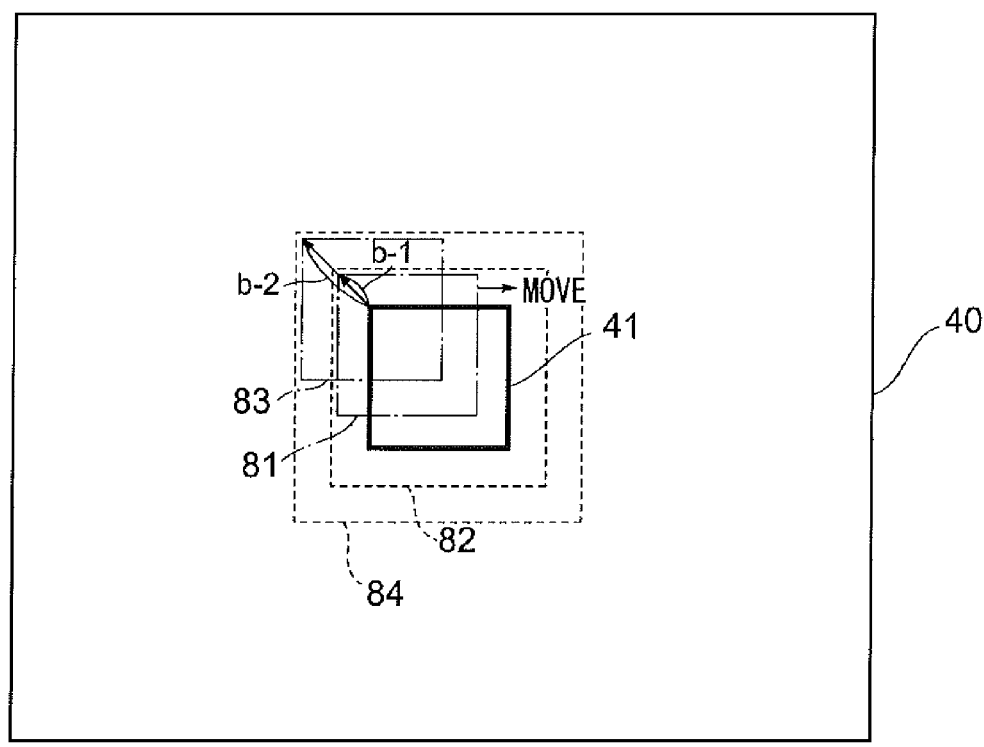
FIG. 21 is an example of a subject image.
Figure 22:
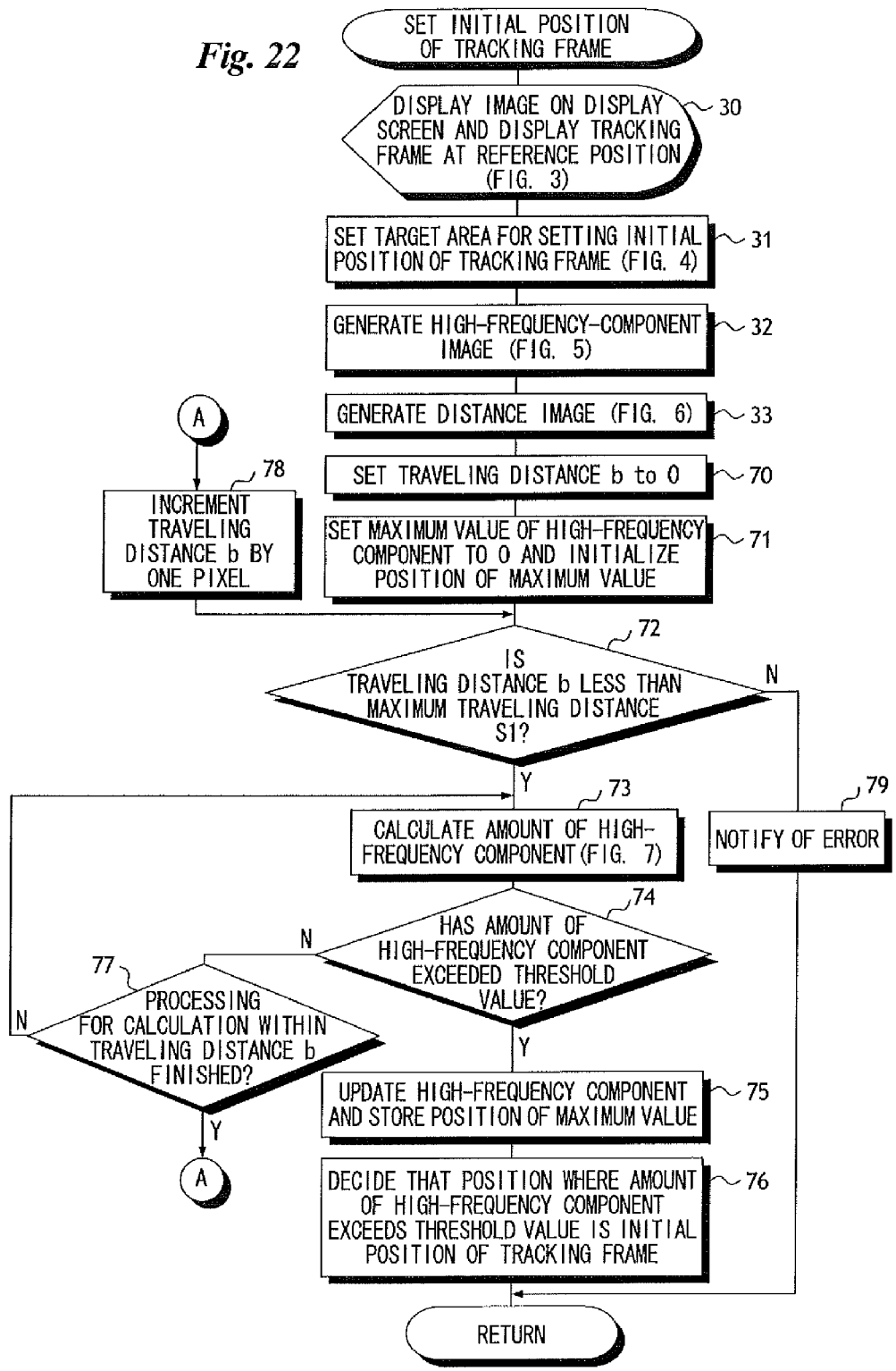
FIG. 22 is a flowchart illustrating a processing procedure for setting the initial position of a tracking frame.

FIGS. 21 and 22 illustrate another embodiment.

FIG. 21 illustrates how moving frame 41 is moved.

In the foregoing embodiments, the movement of the moving frame 41 is arbitrary (usually the moving frame 41 would be moved rightward from the upper left and downward line by line in the manner of a television scan). In this embodiment, however, the moving frame 41 is moved in spiraling fashion outward from the reference position at the central portion of the image 40.

First, the amount of high-frequency component is calculated within the moving frame 41 at the reference position. If the amount of high-frequency component calculated does not exceed a threshold value, the moving frame 41 is moved to the upper left by one pixel (a traveling distance b=1) (the position indicated at reference numeral 81). The amount of high-frequency component is calculated within the moving frame 41 at the position indicated at reference numeral 81. If the amount of high-frequency component calculated does not exceed the threshold value, the moving frame 41 is moved rightward from the position indicated at reference numeral 81 by one pixel and the amount of high-frequency component is calculated. The movement of the moving frame 41 and the calculation of amount of high-frequency component at each position to which the frame is moved are repeated in similar fashion until the amount of high-frequency component exceeds the prescribed threshold value in an area 82 obtained by outwardly widening, by one pixel vertically and horizontally, the moving frame 41 in the case where the moving frame 41 is present at the reference position at the central portion of image 40.

If the amount of high-frequency component in area 82 widened by one pixel vertically and horizontally does not exceed the prescribed threshold value, then the moving frame 41 is moved further to the upper left by one pixel (a traveling distance b which is a total of 2) to a position indicated at reference numeral 83, and the amount of high-frequency component at this position is calculated. Similarly, the moving frame 41 is moved one pixel vertically and horizontally until the amount of high-frequency component exceeds the threshold value, and the movement of the moving frame 41 and the calculation of amount of high-frequency component at each position to which the frame is moved are repeated in similar fashion until the amount of high-frequency component exceeds the prescribed threshold value in an area 84 obtained by outwardly widening, by two pixels vertically and horizontally, the moving frame 41 in the case where the moving frame 41 is present at the reference position at the central portion of image 40.

Thus, the moving frame 41 is moved outward from the central position of the image 40 and the amount of high-frequency component is calculated.

FIG. 22 is a flowchart illustrating a processing procedure for setting the initial position of a tracking frame. Processing steps shown in FIG. 22 identical with those shown in FIG. 2 are designated by like step numbers and a description thereof is omitted.

A high-frequency-component image is generated (step 32) and then a distance image is generated (step 33) as described above. The above-mentioned traveling distance b is set to 0 (step 70). The maximum value of the high-frequency component is set to 0 and the position of the maximum value of the high-frequency component is initialized (step 71). It is determined whether the set traveling distance b is less than a maximum traveling distance S1 (step 72). The maximum traveling distance S1 is one-half the length of either the long side or short side of the image 40 (display screen). The maximum traveling distance S1 may be obtained by subtracting a length which is one-half the length of the diagonal of the moving frame 41 from a length which is one-half the length of the diagonal of the image 40.

If the traveling distance b is equal to or greater than the maximum traveling distance S1 ("NO" at step 72), notification of an error is given (step 79). If the traveling distance b is less than the maximum traveling distance S1 ("YES" at step 72), then, as described above, the amount of high-frequency component within the moving frame 41 at the reference position is calculated (step 73). If the amount of high-frequency component calculated does not exceed the prescribed threshold value ("NO" at step 74), then whether the calculation processing within the traveling distance b has ended is determined (step 77). If the traveling distance b is zero, the moving frame 41 is not moved. The traveling distance b is therefore incremented by one ("YES" at step 77; step 78).

When the traveling distance b becomes 1, the amount of high-frequency component within the area 82 is calculated until the amount of high-frequency component exceeds the threshold value, as mentioned above. If the amount of high-frequency component calculated within the area 82 does not exceed the prescribed threshold value, the traveling distance b is incremented further and the amount of high-frequency component within the area 84 is calculated. If the threshold value is exceeded ("YES" at step 74), the high-frequency component that has been set to 0 is updated as the maximum value of the amount of high-frequency component that exceeded the threshold value and the position at this time is stored (step 75). The stored position is decided upon as the initial position of the tracking frame (step 76).

Since it is not necessarily required to execute processing for calculating the amount of high-frequency component with regard to the entirety of the interior of the target area 42 for setting the initial position of the tracking frame, the time it takes to decide the tracking frame can be shortened.

Figure 23:
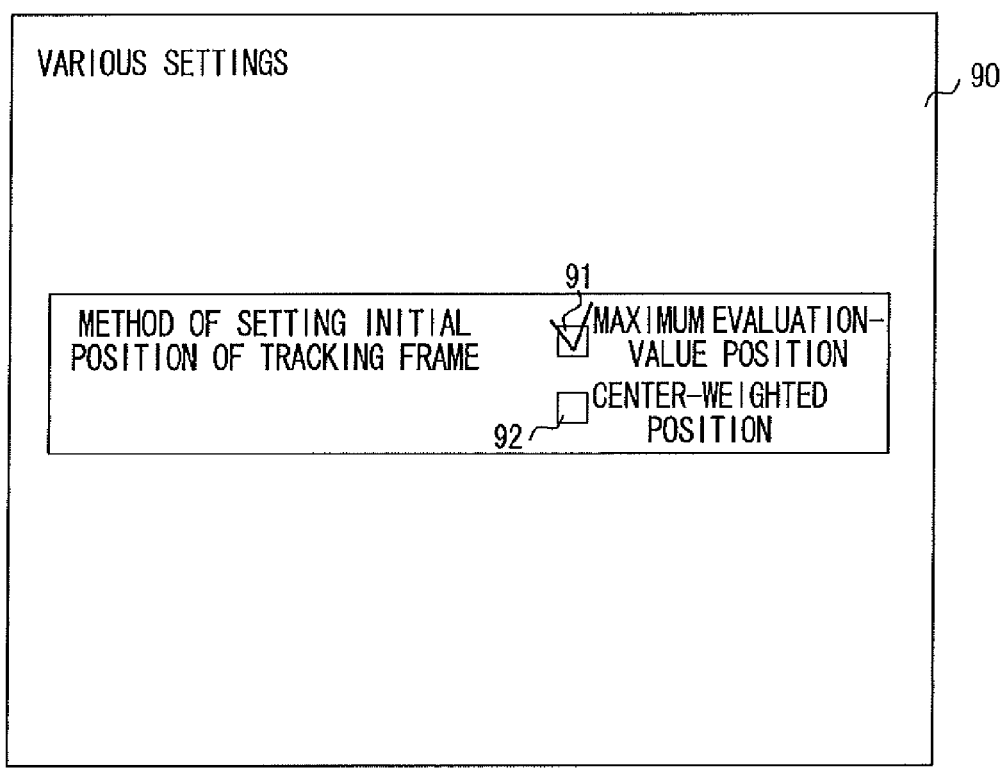
FIG. 23 is an example of a menu image of methods of setting the initial position of a tracking frame.

FIG. 23 is an example of a menu image of a method of setting the initial position of a tracking frame.

If the menu mode is set using the mode setting button on the digital still camera and a menu of a method of setting the initial position of a tracking frame is selected from within the menu mode, a menu image 90 shown in FIG. 23 of a method of setting the initial position of the tracking frame is displayed on the display screen of the display unit 27.

A character string reading "METHOD OF SETTING INITIAL POSITION OF TRACKING FRAME" is displayed substantially at the center of the menu image 90 of the method of setting the initial position of the tracking frame. A first check box 91 and a second check box 92 are displayed to the right of this character string. Characters reading "MAXIMUM EVALUATION-VALUE POSITION" are displayed to the right of the first check box 91, and characters reading "CENTER-WEIGHTED POSITION" are displayed to the right of the second check box 92. Inputting an UP command from the up, down, left, right buttons places a check in the first check box 91, and inputting a DOWN command from the up, down, left, right buttons places a check in the second check box 92.

If the first check box 91 is checked, the above-described processing for calculating the amount of high-frequency component is executed within the entirety of the target area 42 for setting the initial position of the tracking frame, and the position at which the maximum amount of high-frequency component is obtained is decided upon as the initial position of the tracking frame. On the other hand, if the second check box 92 is checked, then, as described above, the moving frame 41 is moved sequentially outward from the reference position and the position of the moving frame 41 prevailing when the amount of high-frequency component obtained with each movement first exceeds the prescribed threshold value is decided upon as the initial position of the tracking frame.

Figure 24:
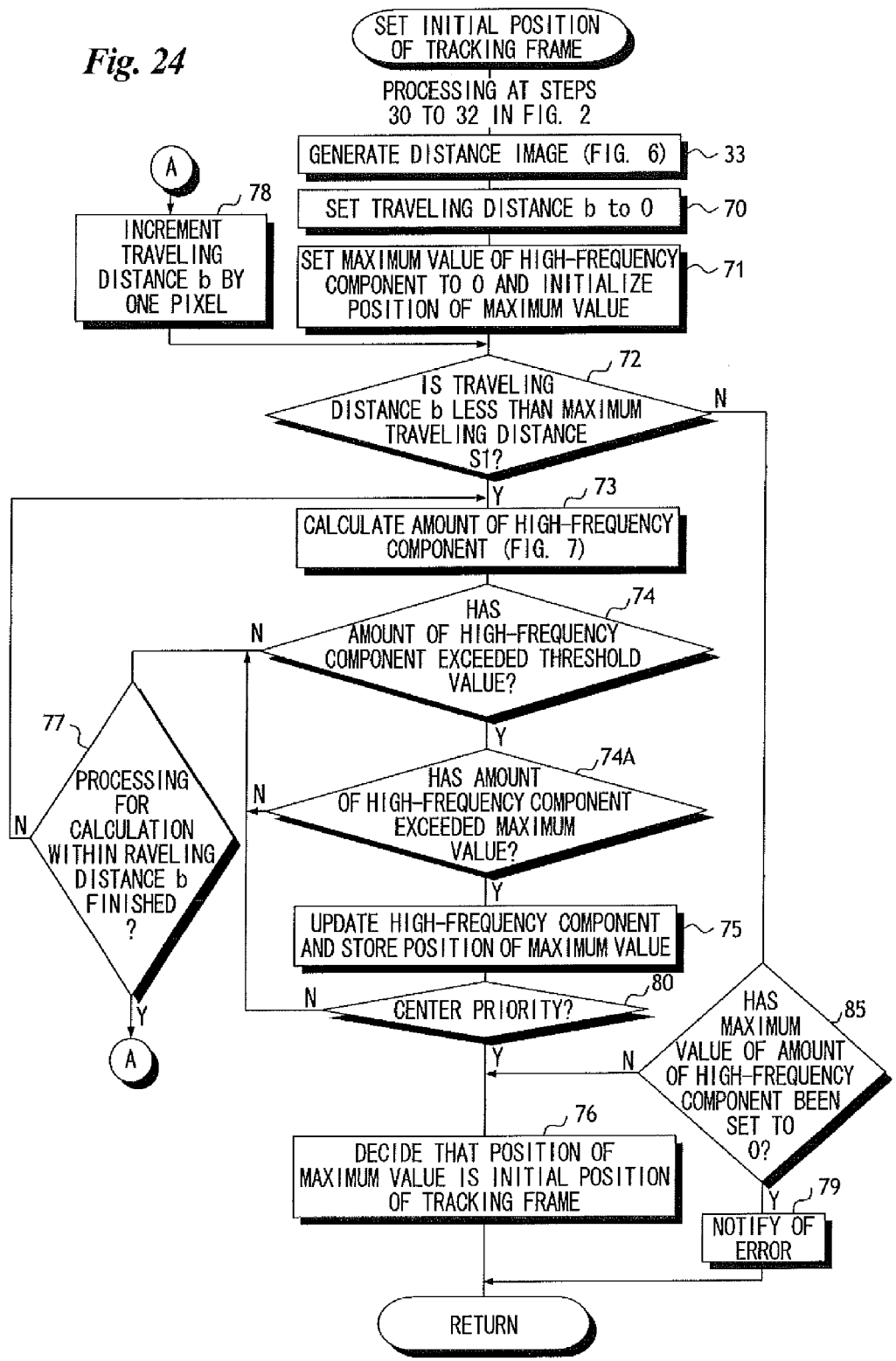
FIG. 24 is a flowchart illustrating a processing procedure for setting the initial position of a tracking frame.

FIG. 24 is a flowchart illustrating a processing procedure for setting the initial position of a tracking frame. Processing steps shown in FIG. 24 identical with those shown in FIG. 22 are designated by like step numbers and a description thereof is omitted.

This processing procedure sets the initial position of the tracking frame in accordance with center priority, in which the initial position of the tracking frame is set at a position close to the center of the screen, and maximum priority, in which the initial position of the tracking frame is set at the position where the amount of high-frequency component is maximum. When the moving frame 41 is moved and the amount of high-frequency component is calculated at the position to which the moving frame is moved, it is determined whether the amount of high-frequency component calculated has exceeded the threshold value (step 74), as described above. If the threshold value is exceeded ("YES" at step 74), then it is determined whether the calculated amount of high-frequency component has exceeded the maximum value (step 74A). This determination processing at step 74A is for the purpose of enabling detection of the position of maximum amount of high-frequency component in a case where maximum priority has been set. If the calculated amount of high-frequency component exceeds the maximum value ("YES" at step 74A), the calculated amount of high-frequency component will be larger than the maximum value of amount of high-frequency component calculated thus far. The maximum value, therefore, it updated (step 75).

If the center-weighted position has been set in the method of setting the initial position of the tracking frame (i.e., if center weighting has been set), as described above ("YES" at step 80), the position of the maximum value is decided upon as the initial position of the tracking frame (step 76). In the case where the center-weighted position has been set, a position near the center of the image 40 is decided upon as the initial position. Since it is considered that the portion the cameraman assumes to be the target image is the center of the image and since the position that will be decided upon as the initial position of the tracking frame 44 is near the center, the cameraman can be prevented from experiencing a sense of incongruity. If the center-weighted position has not been set in the method of setting the initial position of the tracking frame (i.e., if center weighting has not been set) ("NO" at step 80), then the processing for calculating the amount of high-frequency component at all positions within the target area 42 for setting the initial position of the tracking frame is repeated even though the amount of high-frequency component exceeds the threshold value (step 77).

If the traveling distance b exceeds a maximum traveling distance S1 ("NO" at step 72), it is determined whether the maximum value of the amount of high-frequency component is still set at 0 (step 85). If the maximum value of amount of high-frequency component is set at 0 ("YES" at step 85), then a maximum value of amount of high-frequency component that exceeds the threshold value could not be detected. Therefore, the initial position of the tracking frame cannot be decided and an error notification is given (step 79). If the maximum value of amount of high-frequency component has not been set to 0 ("NO" at step 85), this means that an amount of high-frequency component that exceeds the threshold value has been found. Accordingly, this position is decided upon as the initial position of the tracking frame (step 76).

FIGS. 25 to 28 illustrate another embodiment.

Figure 25:
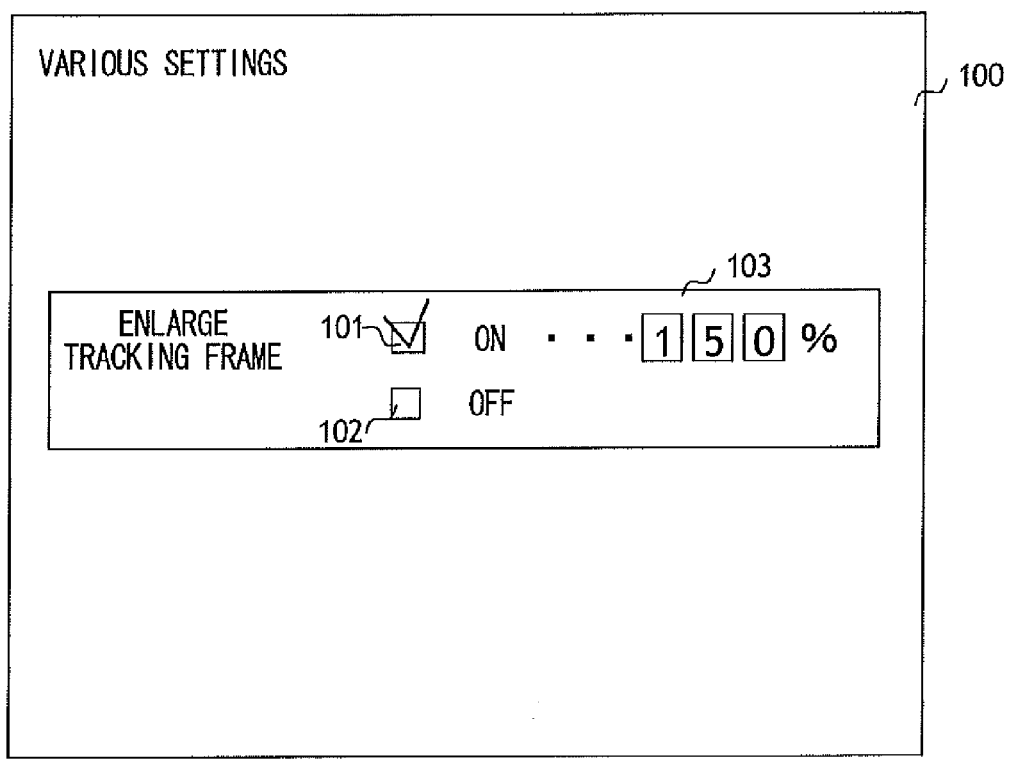
FIG. 25 is an example of a menu image for enlarging a tracking frame.

FIG. 25 is an example of a menu image for enlarging a tracking frame.

If the menu mode is selected using the mode setting button of the digital still camera and a menu for enlarging the tracking frame is selected from within the menu mode, a menu image 100 shown in FIG. 21 for enlarging the tracking frame is displayed on the display screen of the display unit 27.

A character string reading "ENLARGE TRACKING FRAME" is displayed substantially at the center of the menu image 100 for enlarging the tracking frame. A first check box 101 and a second check box 102 are displayed to the right of this character string. Characters reading "ON" are displayed to the right of the first check box 101, and characters reading "OFF" are displayed to the right of the second check box 102. An enlargement-ratio setting area 103 is displayed to the right of the characters "ON" on the right side of the first check box 101. Numerals are displayed in the enlargement-ratio setting area 103. The numerals indicate the enlargement ratio of the tracking frame 41.

Inputting an UP command from the up, down, left, right buttons places a check in the first check box 101, and inputting a DOWN command from the buttons places a check in the second check box 102. If, when the first check box 101 has been checked, a RIGHT command is input from the up, down, left, right buttons, it becomes possible to set the enlargement-ratio setting area 103. When the first check box 101 has been checked, the enlargement ratio is raised in response to an UP-command input from the up, down, left, right buttons, and the enlargement ratio is lowered in response to a DOWN-command input.

Figure 26:
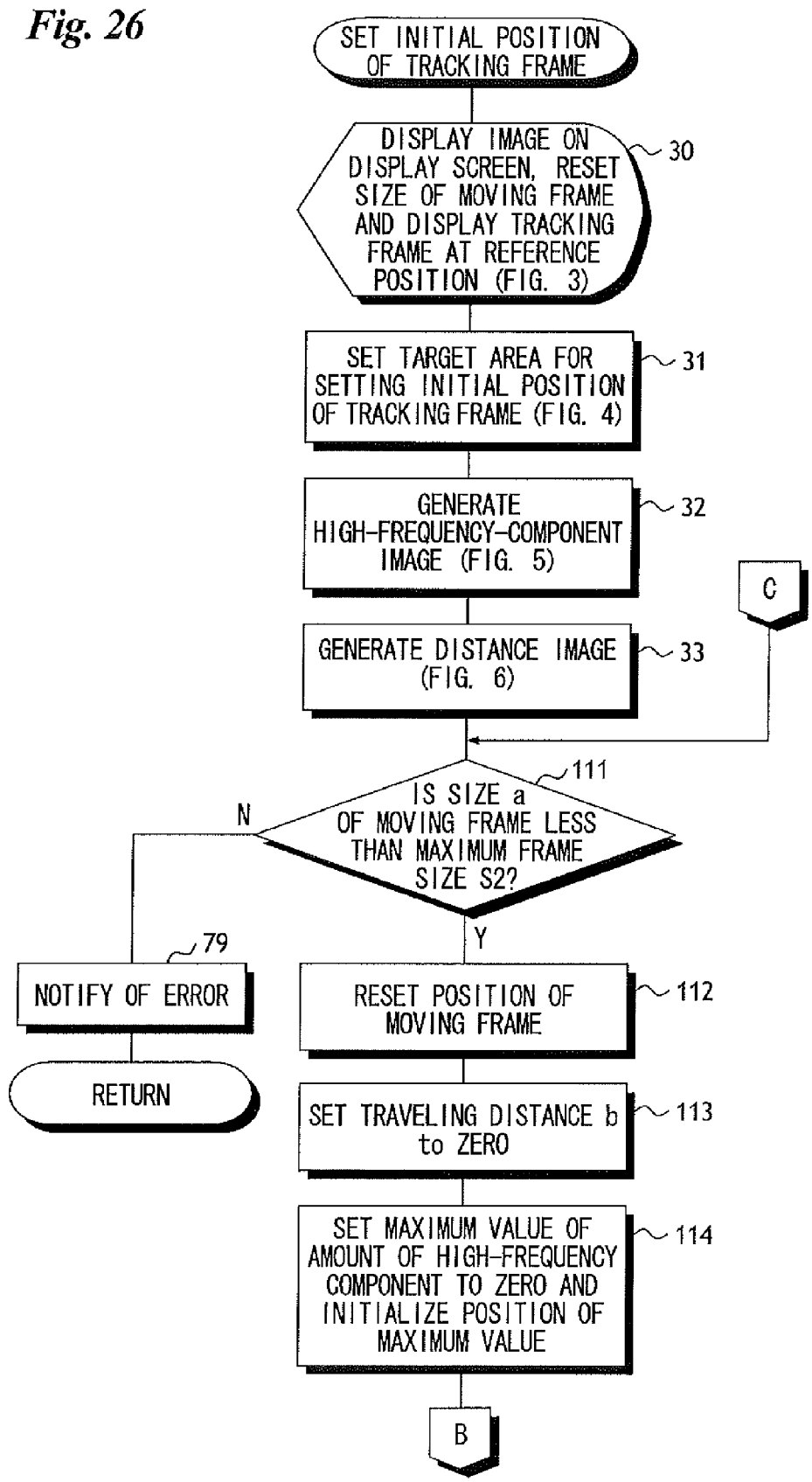
FIG. 26 is a flowchart illustrating a processing procedure for setting the initial position of a tracking frame.
Figure 27:
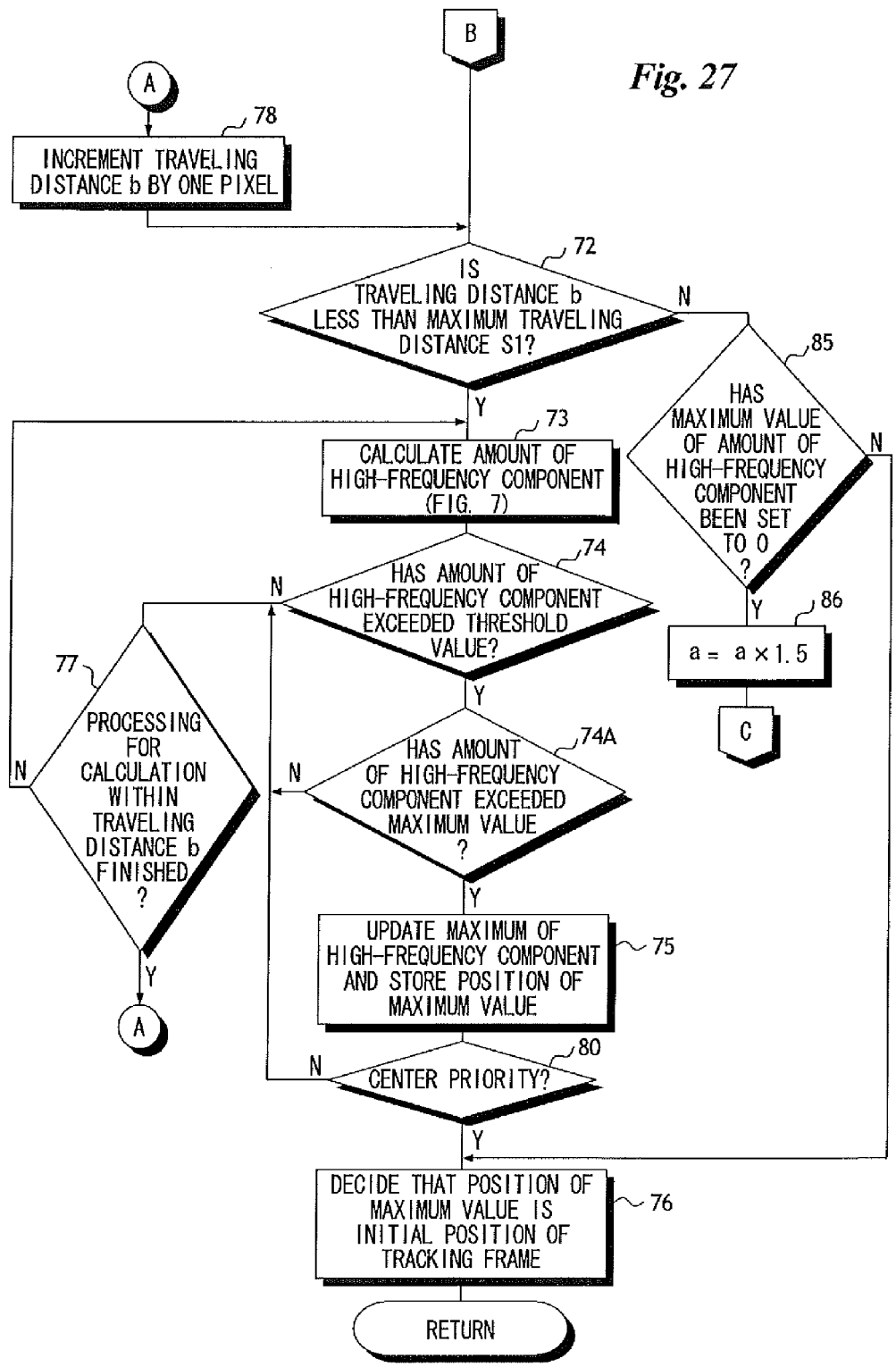
FIG. 27 is a flowchart illustrating a processing procedure for setting the initial position of a tracking frame.
Figure 28:
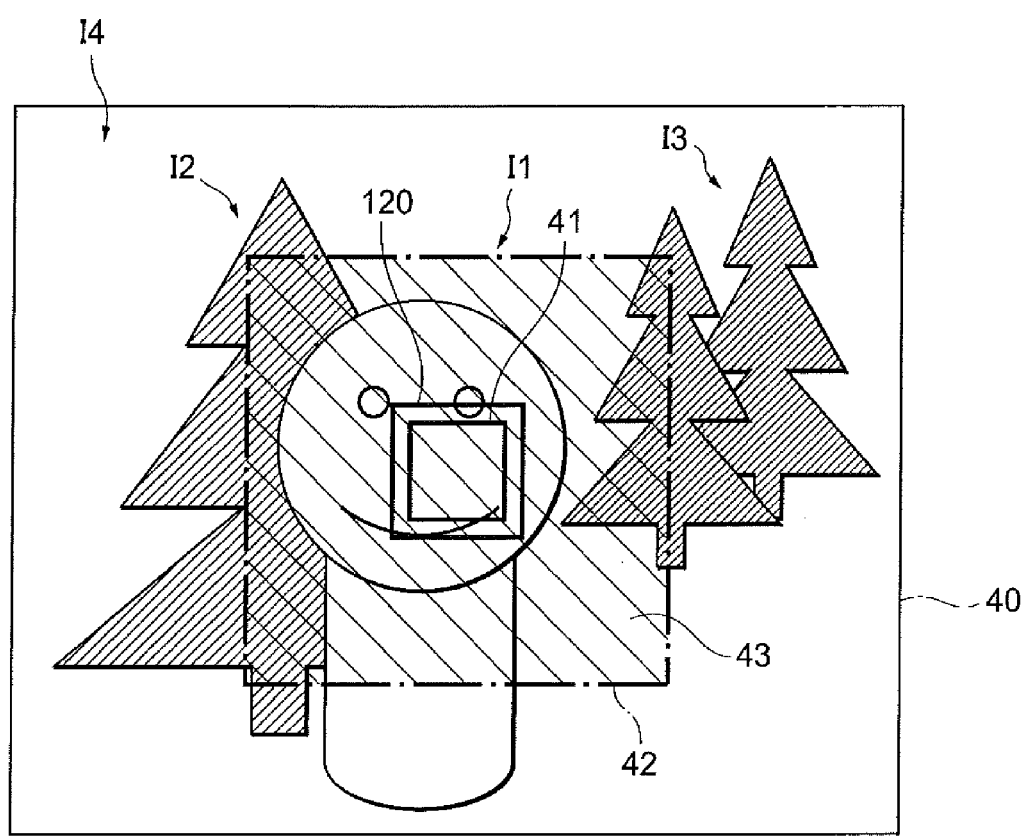
FIG. 28 is an example of a subject image.

FIGS. 26 and 27 are flowcharts illustrating a processing procedure for setting the initial position of a tracking frame. Processing steps shown in FIGS. 26 and 27 identical with those shown in FIG. 24 are designated by like step numbers and a description thereof is omitted. FIG. 28 is an example of a subject image.

This embodiment enlarges the size of the moving frame 41 in accordance with the enlargement ratio set as described above. The size of the moving frame 41 is reset and the tracking frame is displayed at the reference position in the mariner described above (step 30). When the high-frequency-component image is generated (step 32) as well as the distance image (step 33), it is determined whether the size (one side) a of moving frame 41 is less than a maximum frame size S2 (step 111). The maximum frame size S2 is decided beforehand to be smaller than the long side or short side of the image 40. For example, S2=4 a holds.

If the size a of the moving frame becomes larger than the maximum frame size S2 ("NO" at step 111), notification of an error is given (step 79). If the size a of the moving frame is equal to or less than the maximum frame size S2 ("YES" at step 111), then the position of the moving frame is reset and the moving frame 41 is displayed at the reference position (step 113). Further, the traveling distance b is set to zero (step 113) and the maximum value of the amount of high-frequency component is also set to zero (step 114). The position of the maximum value is initialized. As described with reference to FIGS. 21, 22 and the like, if the traveling distance b is less than the maximum frame size 52 ("YES" at step S72), the processing for calculating the amount of high-frequency component is repeated while the moving frame 41 is moved outward from the center with the traveling distance b being gradually increased (steps 72 to 80). If the traveling distance b becomes larger than the maximum traveling distance S1 ("NO" at step 72), it is determined whether the maximum value of the amount of high-frequency component has been set to 0 (step 85). If the high-frequency component has not been set to 0 ("NO" at step 85), this means that there is a high-frequency component that exceeds the threshold value. Accordingly, the position at which the high-frequency component has been obtained is decided upon as the initial position of the tracking frame (step 76). If the maximum value of the amount of high-frequency component has been set to 0 ("YES" at step 85), this means that a maximum value of amount of high-frequency component above the threshold value has not been obtained within this area. Accordingly, the size of the moving frame 41 is enlarged to the size that has been set (enlarged moving frame 120) (step 81), as illustrated in FIG. 28. While the enlarged moving frame 120 is being moved again, the processing for calculating the amount of high-frequency component is repeated at every position to which the frame is moved.

In a case where the amount of high-frequency component does not exceed the prescribed threshold value, the moving frame 41 is enlarged and, hence, the value of the amount of high-frequency component increases. The value of the amount of high-frequency component comes to exceed the prescribed threshold value and the initial position of the tracking frame 44 can be decided.

Figure 29:
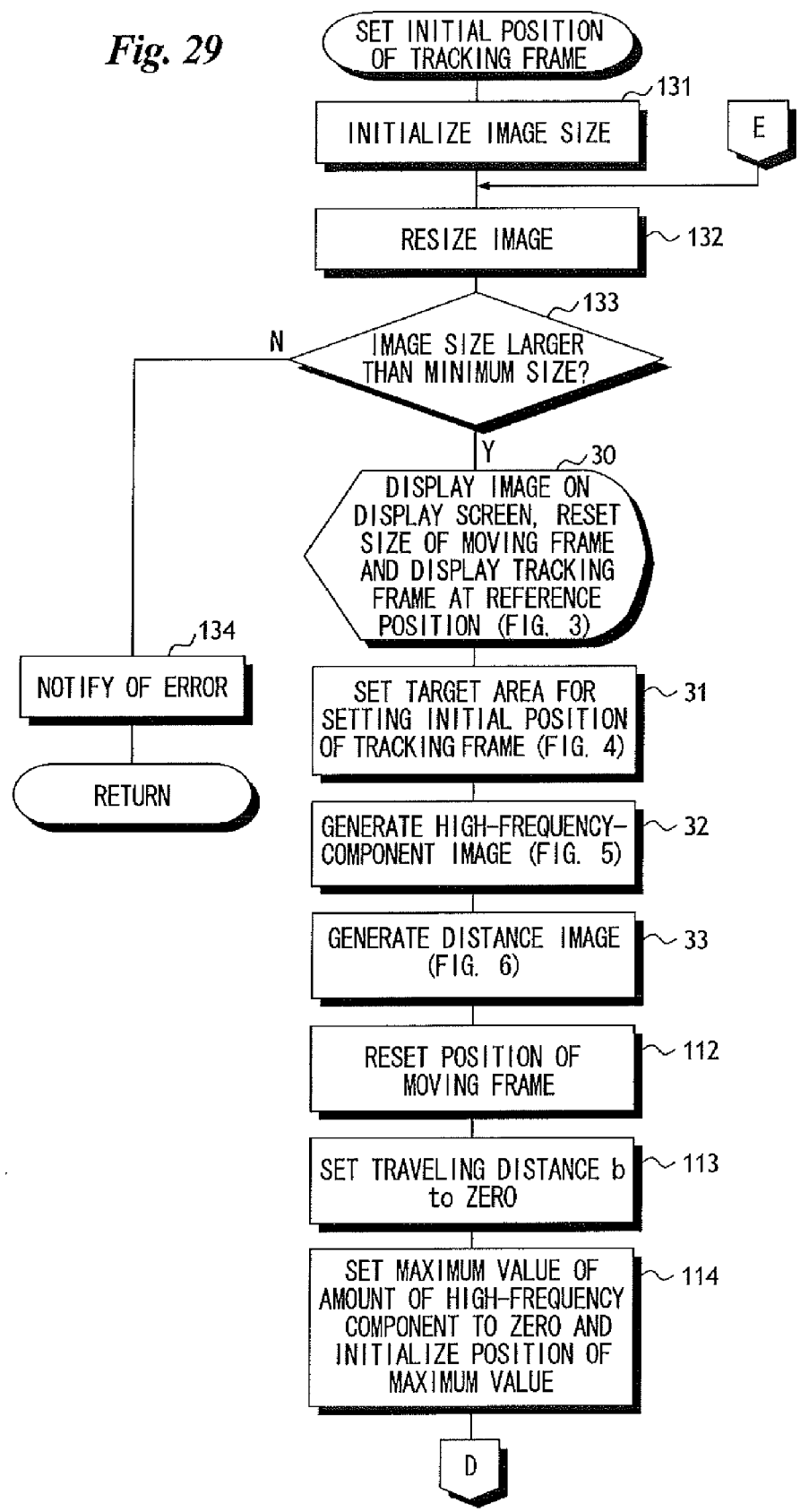
FIG. 29 is a flowchart illustrating a processing procedure for setting the initial position of a tracking frame.
Figure 30:
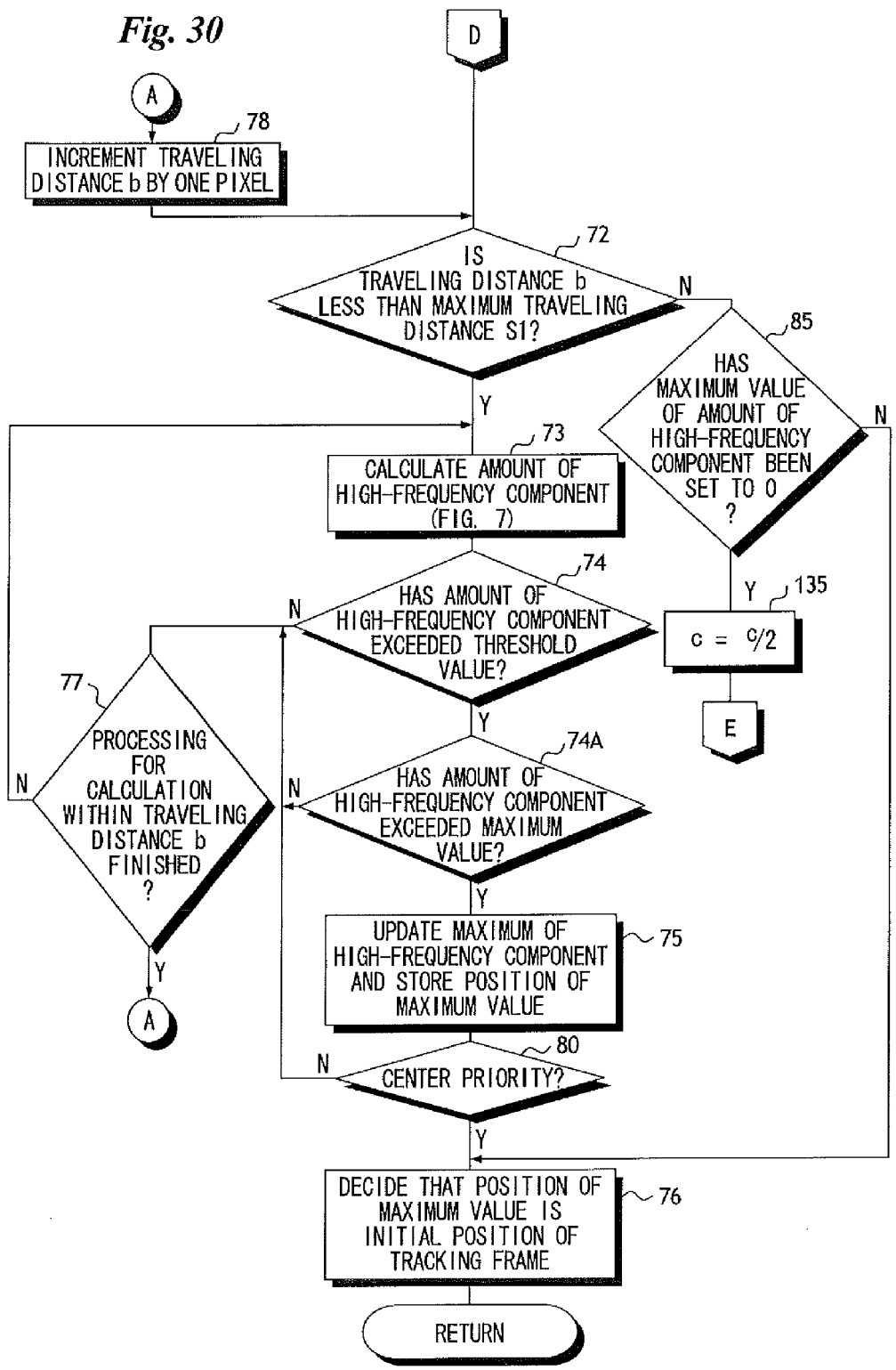
FIG. 30 is a flowchart illustrating a processing procedure for setting the initial position of a tracking frame.

FIGS. 29 to 31 illustrate a further embodiment.

FIGS. 29 and 30 are flowcharts illustrating a processing procedure for setting the initial position of a tracking frame. Processing steps shown in FIGS. 29 and 30 identical with those shown in FIGS. 26 and 27 are designated by like step numbers and a description thereof is omitted. FIG. 31 is an example of subject image 40.

The size of the moving frame 41 is enlarged in the foregoing embodiment. In this embodiment, however, the size of the subject image 40 is reduced. It becomes easier for the amount of high-frequency component to exceed the threshold value in a manner similar to the above case where the size of the moving frame 41 was enlarged.

The size of the subject image 40 is initialized to a prescribed size (step 131), as illustrated by the diagram at the top of FIG. 31. Next, subject image 40 is resized (step 132). At the start, resize processing is not necessary and may therefore be skipped. In a case where the resizing is performed n such a manner that the image is reduced to less than ⅛ of its original size, it may be arranged so that false-color and false-signal reduction processing is executed.

If image size is not larger than a minimum size ("NO" at step 133), an error notification is given (step 134). If image size is larger than the minimum size ("YES" at step 133), then processing for calculating the amount of high-frequency component within the moving frame 41 is executed (steps 30 to 33, steps 112 to 114, steps 72 to 80, etc.).

If the initial position of the tracking frame 44 is not decided and the traveling distance b becomes larger than the maximum traveling distance S1 ("NO" at step 72), it is determined whether the maximum value of the amount of high-frequency component has been set to 0 (step 85). If the maximum value of the high-frequency component has not been set to 0 ("NO" at step 85), this means that there is already a position at which the maximum value of amount of high-frequency component above the threshold value has been obtained. Accordingly, this position is decided upon as the initial position of the tracking frame (step 76). If the maximum value of the amount of high-frequency component has been set to 0 ("YES" at step 85), image size (the long side or short side of the image 40) c is halved (step 135). As a result, the subject image 40 is reduced in size, as illustrated by the diagram at the bottom of FIG. 31, and processing for calculating the amount of high-frequency component is repeated using subject image 405 of reduced size. It will be understood that since the amount of high-frequency component calculated based upon the image within the moving frame 41 increases, the amount of high-frequency component will exceed the threshold value and the initial position of the tracking frame can be decided.

In the foregoing embodiments, amounts of high-frequency component are calculated while moving the moving frame within a high-frequency-component image obtained by extracting high-frequency components from an image within a target area for setting the initial position of the tracking frame, and the position of the moving frame at which is obtained an amount of high-frequency component greater than a threshold value or a maximum amount of high-frequency component is decided upon as the initial position of the tracking frame. However, it may be arranged so that in a case where the amount of high-frequency component is too large (a case where, if the above-mentioned threshold value is assumed to be a first threshold value, the amount of high-frequency component exceeds a second threshold value greater than the first threshold value), the processing for calculating the amount of high-frequency component is executed upon generating the high-frequency-component image after one image is smoothened, using a low-pass filter, before the high-frequency-component image is generated. If the target image within the tracking frame decided in the processing for deciding the initial position contains too many edge components, there is the possibility that tracking will no longer be achievable owing to just a slight shift in the tracking frame in a case where a target image contained in the image of a subject that is input after one image is tracked utilizing the target image and template matching, etc. By generating the high-frequency-component image after smoothing is performed and then executing the processing for calculating the amount of high-frequency component, it is possible to prevent an inability to perform tracking owing to just a slight shift in the tracking frame.

In the foregoing embodiments, rather than generate the high-frequency-component-image of the image within the target area for setting the initial position of the tracking frame, it is permissible to generate, through use of a low-pass filter or band-pass filter, a low-frequency-component image or an intermediate--frequency-component image of an image within the target area for setting the initial position of the tracking frame, and to decide, in a manner similar to that described above, that the position of the moving frame, at which a large amount of low-frequency component or intermediate-frequency component is obtained, is the initial position of the tracking frame. Further, in a case where the frequency band of the target image is known, tracking of the target image will become more accurate by adopting, as the initial position of the tracking frame, the position of the moving frame at which the amount of intermediate-frequency component increases through use of a band-pass filter of the kind that extracts amounts of components of the frequency band.

Furthermore, in the foregoing processing, rather than generate an image having a specific frequency component from an image within the target area for setting the initial position of the tracking frame, the position of the moving frame at which the amount of a set color component (a color component of the target image) increases may be adopted as the initial position of the tracking frame.

In the foregoing embodiments, the target area for setting the initial position of the tracking frame is set, a high-frequency-component image is generated within this set area and, while the moving frame is moved within the high-frequency-component image generated, the amount of high-frequency component is calculated at every position to which the frame is moved. However, it may be arranged so that the moving frame is moved within the set area without generating the high-frequency-component image, and the amount of high-frequency component of the image within the moving frame is calculated at every position to which the frame is moved.

Further, the tracking frame and the moving frame may be of the same size and shape or may be of different size and shape. For example, in a case where the moving frame is made a rectangular frame having one side equal to a, the tracking frame may be made a rectangular frame having one side equal to 0.8×a.

Figure 32:
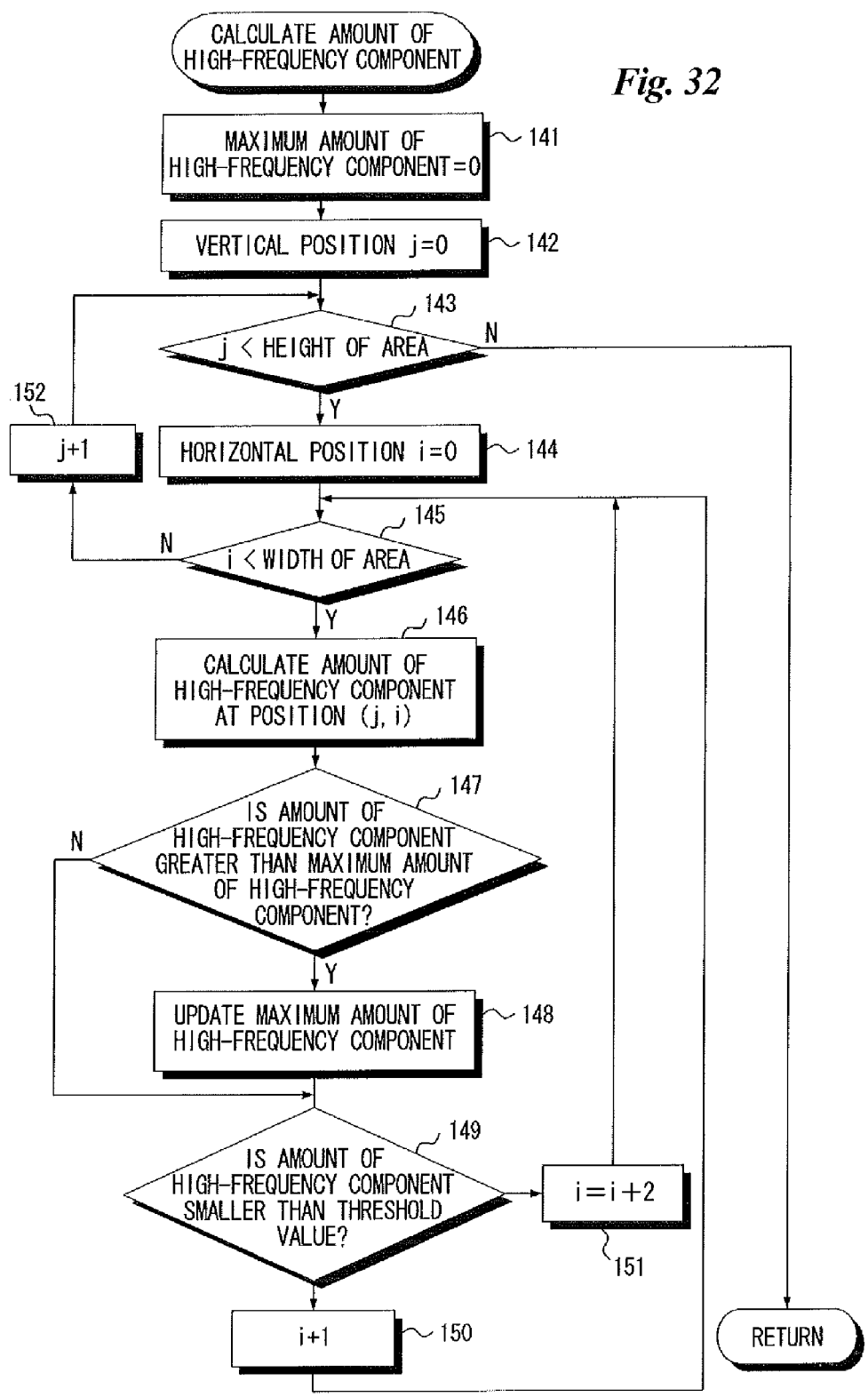
FIG. 32 is a flowchart i illustrating a processing procedure for calculating amount of high-frequency component.

FIG. 32, which shows a modification, is a flowchart illustrating a processing procedure (e.g., the processing procedure of step 34 in FIG. 2) for calculating amounts of high-frequency component while moving the moving frame.

In this processing procedure, the moving frame 44 has its traveling distance thus far increased by two pixels if the amount of high-frequency component within the moving frame 44 is less than a prescribed threshold value, and has its traveling distance thus far increased by one pixel if the amount of high-frequency component within the moving frame 44 is equal to or greater than the threshold value.

First, the maximum amount of high-frequency component is reset to zero (step 141). Vertical position j of the moving frame is reset to zero (step 142).

Figure 33:
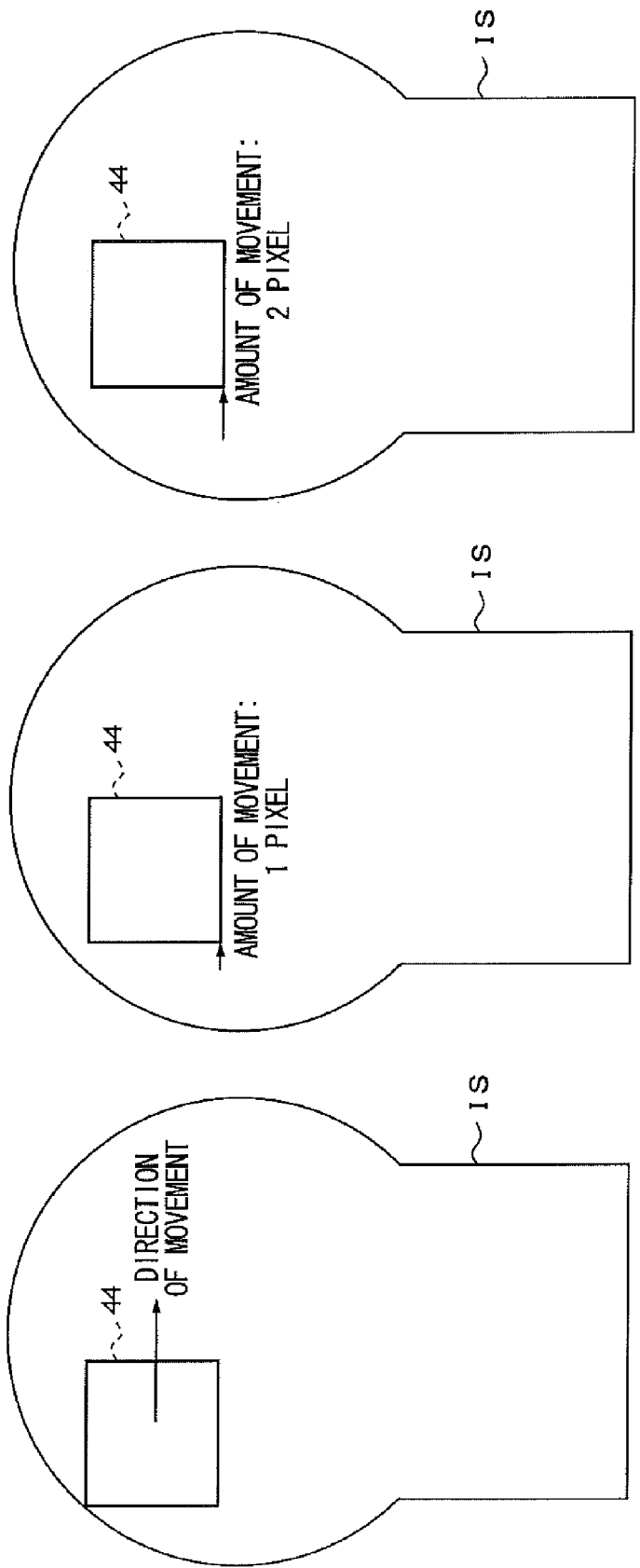
FIG. 33 illustrates the manner in which a moving frame moves.

The diagram on the left side of FIG. 33 illustrates the relationship between the moving frame 44 and the search area IS. In the moving frame 44 that falls within the search area IS, the coordinates of the upper-left corner of the moving frame in a case where the frame is positioned at the upper-leftmost position are assumed to be those of the origin (0,0). The vertical position is j=0 in a case where the moving frame 44 has been positioned at the origin, and the horizontal position is i=0, as will be described later. The position of the moving frame 44 is decided by the vertical position j and horizontal position i.

With reference again to FIG. 32, it is determined whether the vertical position is smaller than the vertical height (length) of the search area IS defined by the height of the search area IS (step 143). If the vertical position j is smaller than the vertical height (length) of the search area IS ("YES" at step 143), this means that at least a portion of the moving frame 44 is contained in the search area IS. The horizontal position i is then reset to zero (step 144) and it is determined whether the horizontal position i is smaller than the horizontal width (length) of the search area IS (step 145). If the horizontal position i is smaller than the horizontal length of the search area IS ("YES" at step 145), this means that at least a portion of the moving frame 44 is contained within the search area IS. The amount of high-frequency component of the image within the moving frame 44 is then calculated at the position where the upper-left corner of the moving frame 44 is a position defined by the vertical position j and horizontal position i (step 146).

If the amount of high-frequency component calculated is greater than the maximum amount of high-frequency component, then the amount of high-frequency component calculated is updated to the maximum amount of high-frequency component (step 148).

It is determined whether the amount of high-frequency component calculated is smaller than a prescribed threshold value (step 149). If the amount of high-frequency component calculated is equal to or greater than the prescribed threshold value ("NO" at step 149), the image within the moving frame 44 is in high definition and the traveling distance of the moving frame 44 is made a distance obtained by adding one pixel to the horizontal position i (step 150), as shown by the diagram at the middle of FIG. 33. If the amount of high-frequency component calculated is smaller than the prescribed threshold value ("YES" at step 149), then the image within the moving frame 44 cannot be construed to be in high definition and the traveling distance of the moving frame 44 is made a distance obtained by adding two pixels to the horizontal position i (step 151), as shown by the diagram on the right side of FIG. 33. At the position obtained after the moving frame 44 is moved, the amount of high-frequency component calculated at this position and the maximum amount of high-frequency component are compared and the traveling distance of the moving frame 44 is decided in accordance with the result of the comparison (steps 145 to 151).

If the value of the horizontal position i is equal to or greater than the length of the area in the horizontal direction ("NO" at step 145), this means that the moving frame 44 has moved out of the search area IS in the horizontal direction and that a portion thereof is no longer contained in the search area IS. The position j to which the frame has been moved in incremented in order that the moving frame 44 will be moved in the vertical direction (step 152). If the position j to which the frame has been moved becomes equal to or greater than the height of the search area IS, processing ends ("NO" at step 143).

Figure 34:
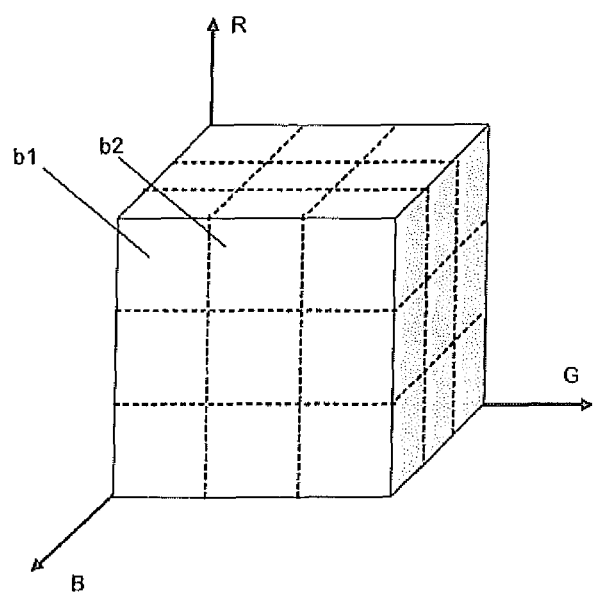
FIG. 34 illustrates RGB color space.
Figure 35:
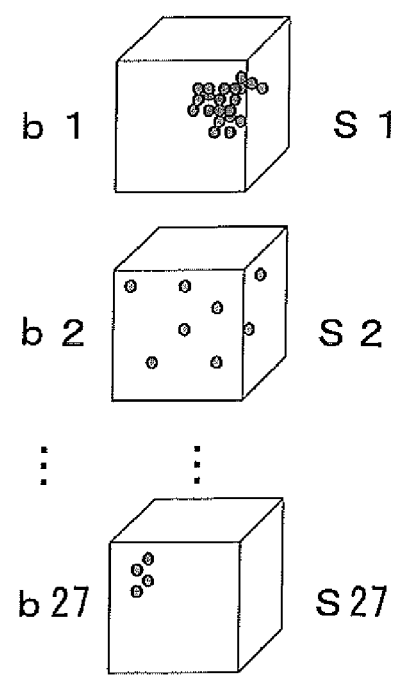
FIG. 35 illustrates the manner in which pixels are distributed.

FIGS. 34 and 35 illustrate a modification. This modification utilizes the state of distribution of color components in color space in a case where the initial position of the tracking frame 41 is decided utilizing color components.

FIG. 34 illustrates RGB color space (which may just as well be another color space such as CrCb color space).

Consider a space 160 delimited by (0,0,0), (0,255,0), (0,0, 255), (0,255,255), (255,0,0), (255,0,255) and (255,255, 255). The space 160 is divided into three equal portions (but not necessarily three equal portions) along each coordinate axis so as to form a total of 27 small blocks b1 to b27.

The moving frame 44 is moved within the target area 42 for setting the initial position of the tracking frame, as mentioned above, and the number of pixels within the moving frame 44 is plotted in the color space of FIG. 34 at every position to which the frame is moving frame is moved. Plotted numbers S1 to S27 of pixels are calculated in respective ones of the small blocks b1 to b27, as illustrated in FIG. 35. The largest number of pixels among the calculated numbers S1 to S27 of pixels is detected as a maximum pixel count Smax at the position to which the moving frame has been moved.

The above-described processing for calculating the maximum pixel count Smax is executed at every position to which the moving frame 44 is moved and the position having the largest value among the values of the maximum pixel count Smax at each of the positions to which the frame has been moved is decided upon as the initial position of the tracking frame 41.

FIGS. 36 to 40, which shows another embodiment, carry out an automatic tracking processing from the initial position set as mentioned above.

Figure 36:
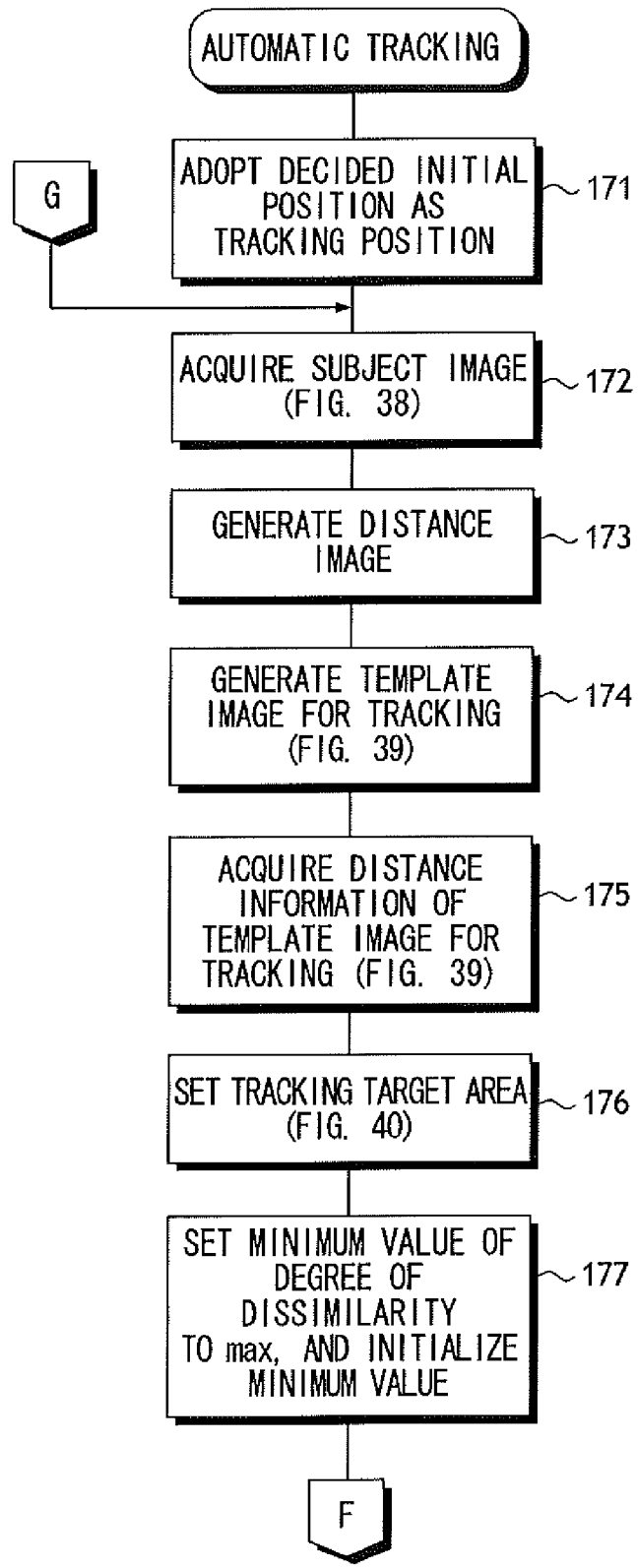
FIG. 36 is a flowchart illustrating an automatic tracking processing procedure.
Figure 37:
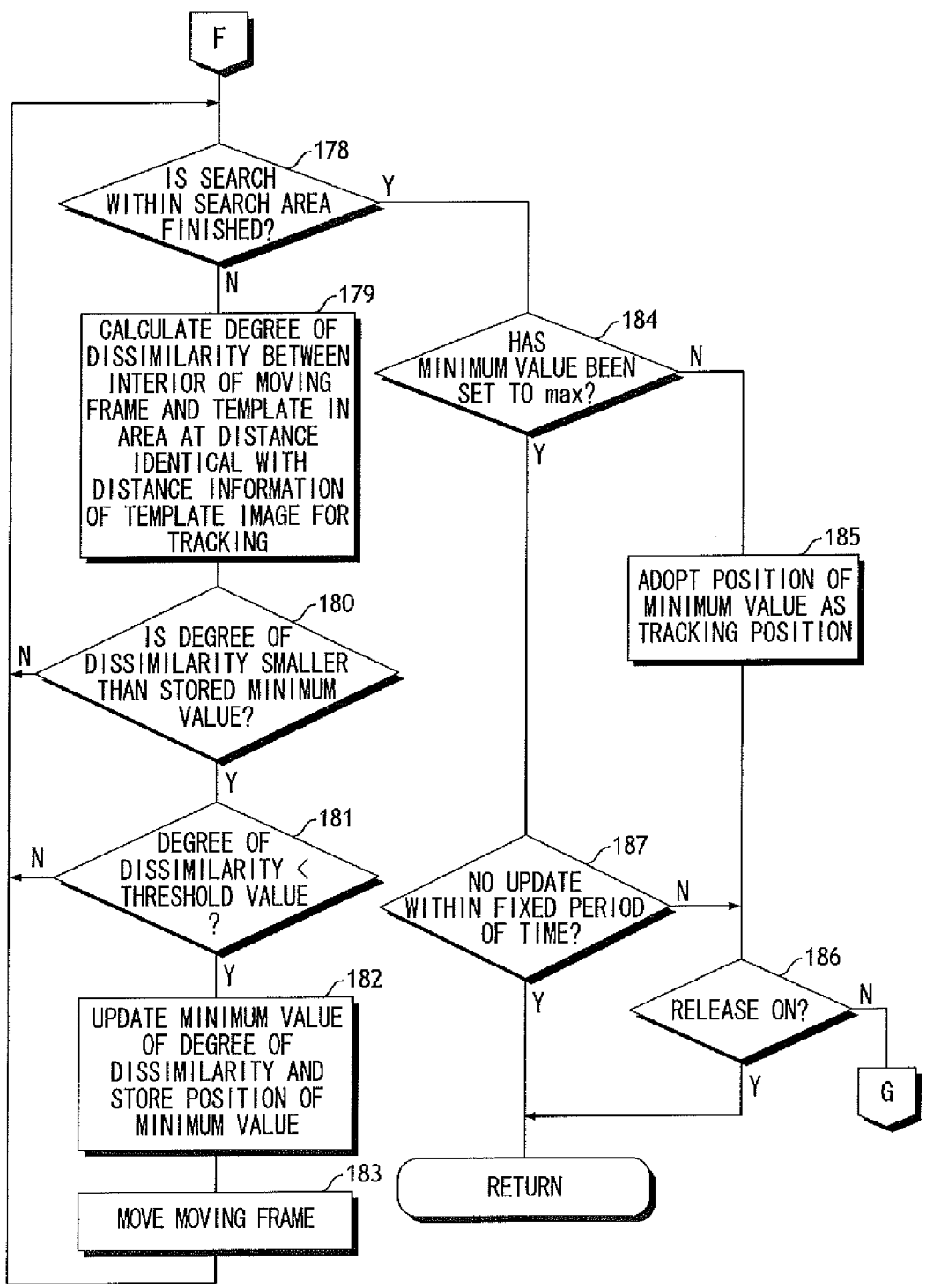
FIG. 37 is a flowchart illustrating an automatic tracking processing procedure.

FIGS. 36 and 37 are flowcharts illustrating an automatic tracking processing procedure.

First, an initial position decided in the manner described above is adopted as a tracking position (step 171). Next, a subject is imaged and the image of the subject is obtained (step 172). When the subject image is obtained, the tracking frame is displayed at the tracking position. Furthermore, as described above, a distance image (see FIG. 6) is generated (step 173).

Figure 38:
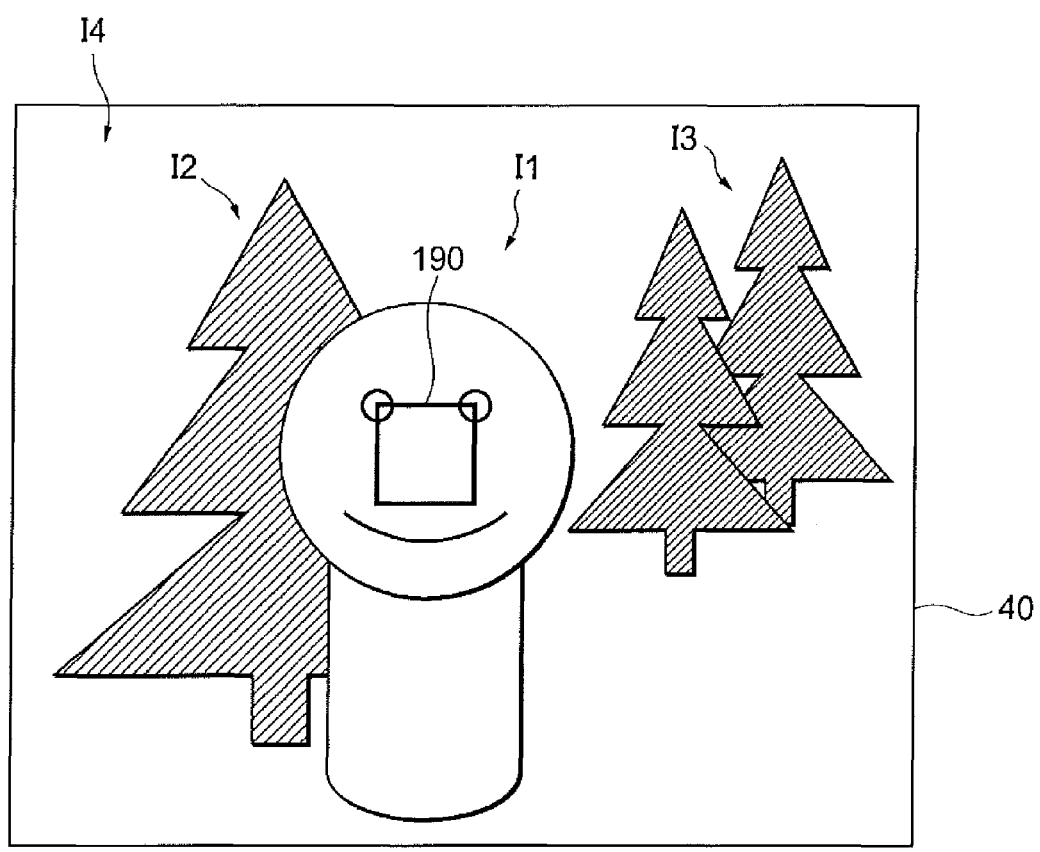
FIG. 38 is an example of a subject image.

FIG. 38 is an example of the subject image 40 obtained.

In a manner similar to that described above, the subject image 40 contains the person image I1, the first tree image I2, the second tree image I3 and the background image I4. A tracking frame 190 is being displayed at a tracking position within the person image I1 contained in the subject image 40. A template image for tracking purposes, which image will be the tracking target image, is generated from the image within the tracking frame 190 (step 174 in FIG. 36).

The upper part of FIG. 39 is an example of a tracking template image 191.

The tracking template image 191 is an image contained in the tracking frame 190 in a case where, as mentioned above, the tracking frame 190 has been positioned at the position decided upon as the initial position of the tracking frame 190. Since the initial position of the tracking frame 190 is the position of an image portion at which there are many high-frequency components, as described above, the tracking template image 191 also has many high-frequency components. As a consequence, tracking processing using the tracking template image 191 is executed comparatively easily.

When the tracking template image 190 is generated, distance information, which represents the distance to the subject represented by the image portion for which the tracking template image 190 as been obtained, is acquired from the distance image (step 175 in FIG. 36).

The lower part of FIG. 39 illustrates distance information 192.

The distance information 192 represents the distance to the subject represented by the image portion for which the tracking template image 190 has been obtained. Since the tracking template image 190 is obtained from the person image I1, the distance information of the tracking template image 190 represents the distance from the digital still camera to the person represented by the person image I1.

Next, a tracking target area, which is an area in which the tracking frame tracks a target image, is set (step 176 in FIG. 36).

Figure 40:
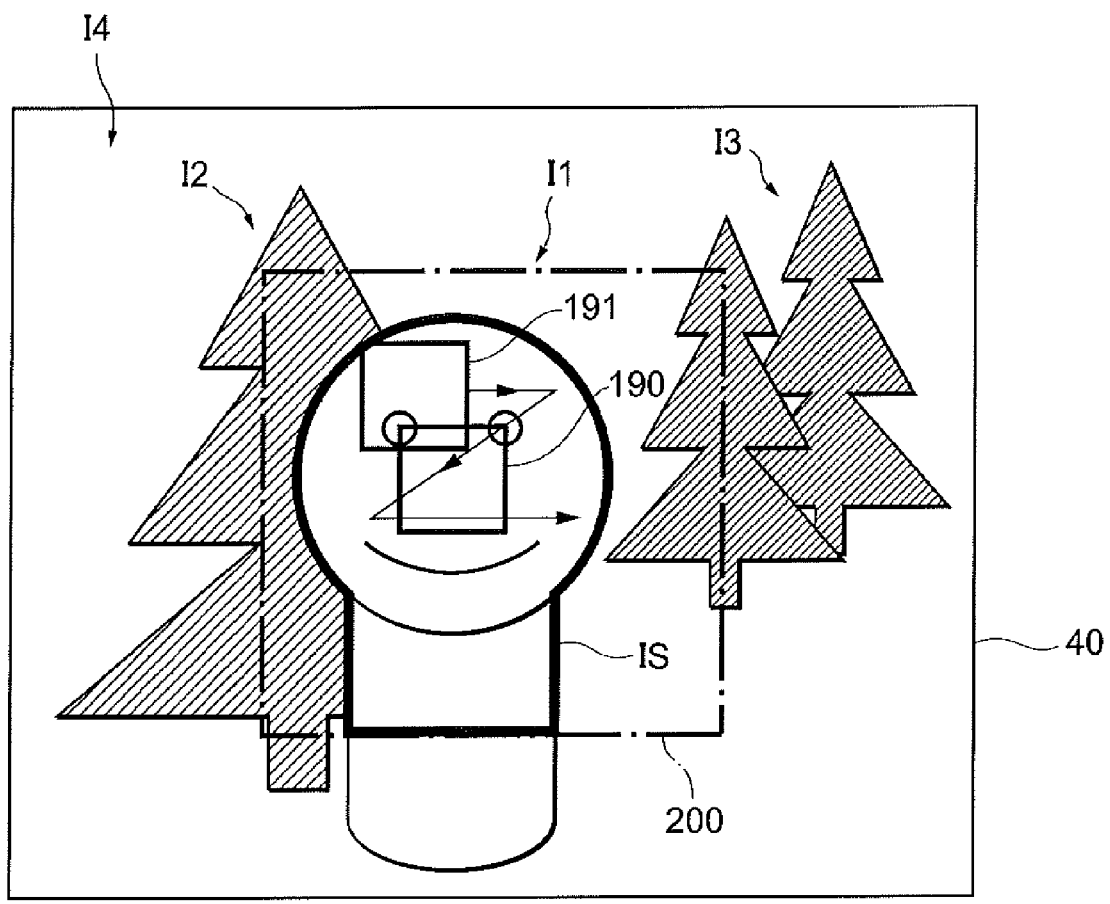
FIG. 40 is an example of a subject image.

FIG. 40 is an example of the subject image 40.

As described above, the tracking frame 190 is displayed on the person image I1 and a tracking target area 200 is set so as to surround the tracking frame 190.

In tracking processing as well, in a manner similar to that of the above-described processing for determining the initial position of the tracking frame, an image portion, which is inside the tracking target area 200, and which represents a subject whose distance is identical with the distance represented by the distance information of the tracking template image 190, is adopted as the search area IS. Since the template image 190 is a portion of the person image I1 as mentioned above, the area of the person image I1 within the tracking target area 200 becomes the search area IS.

Next, an image portion similar to the tracking template image 190 is found and the tracking frame is displayed on this image portion. Therefore, it is construed that as the degree of dissimilarity between the tracking template image 190 and the image portion diminishes, the more this image portion will resemble the tracking template image 190. Since an image portion is found in such a manner that the degree of dissimilarity diminishes, the minimum value of the degree of dissimilarity is set to max and the position at which this occurs is initialized (step 177 in FIG. 36).

If the search within the search area using the template image 190 has not ended ("NO" at step 178 in FIG. 37), a moving frame 191 having the same size as that of the tracking frame 190 is set within the search area IS and the degree of dissimilarity between the image within the moving frame 191 and the template image 190 is calculated (step 179). Since there is a degree of dissimilarity, the smaller the degree of dissimilarity, the more similar are the image within the moving frame 191 and the template image 190. That is, the degree of dissimilarity is calculated between the template image 190 and the image within the moving frame 191 in the search area IS that is at a distance identical with the distance information of the tracking template image 190. This degree of dissimilarity, which is represented by an absolute difference value $R_{SAD}$ between the image inside the moving frame 191 and the template image 190, is calculated in accordance with Equation 1, where is the x coordinate of a pixel constituting the image (template image 190) within the moving frame 191, j is the y coordinate of a pixel constituting the image (template image 190) within the moving frame 191, the luminance value of the image within the moving frame 191 is represented by I(i,j), and the luminance value of the template image 190 is represented by T(i,j). Further, N is the number of pixels along the Y direction of pixels constituting the image (template image 190) within the moving frame 191, and M is the number of pixels along the X direction of pixels constituting the image within the moving frame 191.

$$R_{SAD} = \sum_{j=0}^{N-1} \sum_{i=0}^{M-1} |I(i, j) - T(i, j)| \qquad \text{Equation 1}$$

Further, the degree of dissimilarity may be expressed by $R_{SSD}$, which is the sum of the squared difference between the image within the moving frame 191 and the template image 190. The sum of the squared difference RSSD is calculated in accordance with Equation 2.

$$R_{SSD} = \sum_{j=0}^{N-1} \sum_{i=0}^{M-1} (I(i, j) - T(i, j))^2 \qquad \text{Equation 2}$$

If the calculated degree of dissimilarity is larger than a degree of dissimilarity already stored ("NO" at step 180), this means that the image portion that existed when the already stored degree of dissimilarity was obtained is more similar to the tracking template image 190 than is the image portion for which the calculated degree of dissimilarity was obtained. Dissimilarity updating and the like therefore is not carried out. If the calculated degree of dissimilarity is smaller than a degree of dissimilarity already stored ("YES" at step 180), it is determined whether the calculated degree of dissimilarity is smaller than a prescribed threshold value (step 181). If the calculated degree of dissimilarity were to be updated in a case where it is equal to or greater than the prescribed threshold value, tracking processing would be executed and erroneous tracking would result even if the target image no longer existed inside the subject image 40. Therefore, in a case where the calculated degree of dissimilarity is less than the prescribed threshold value ("YES" at step 181), updating of the minimum value of the degree of dissimilarity is performed and the position of the minimum value at this time is stored (step 182). Thereafter, the moving frame is moved within the search area IS and processing from step 179 to step 182 is repeated.

When the search within the search area IS using the moving frame 191 ends ("YES" at step 178), it is determined whether the minimum value of the degree of dissimilarity has been set to max (step 184). If the minimum value of the degree of dissimilarity has been set to max ("YES" at step 184), this means that tracking of the target image has not been achieved. If the tracking position is not updated within a fixed period of time (step 187), it is construed that the target image has departed from the search zone and, hence, tracking processing ends. If the minimum value of the degree of dissimilarity has not been set to max ("NO" at step 184), then the minimum value is updated. Accordingly, the position of this minimum value is adopted as the tracking position (step 185). If a shutter-release operation is performed ("YES" at step 186), tracking processing ends. If the shutter is not released ("NO" at step 186), then processing is repeated from step 172.

Figure 41:
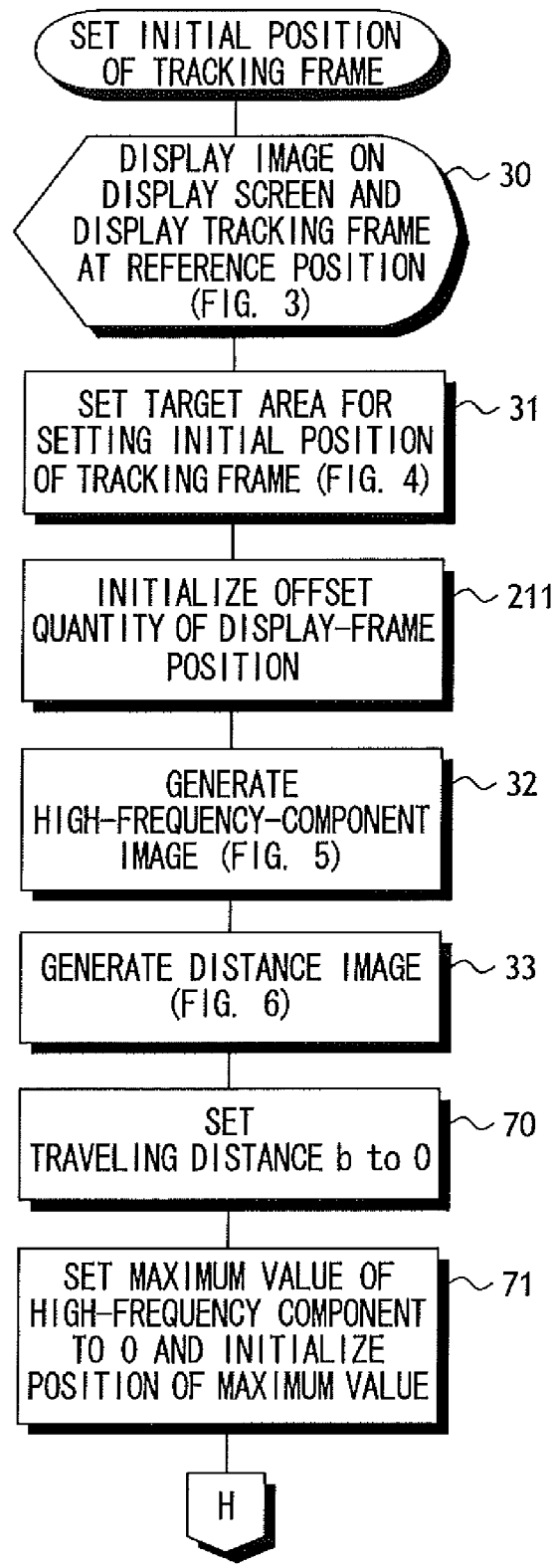
FIG. 41 is a flowchart illustrating a processing procedure for setting the initial position of a tracking frame.
Figure 42:
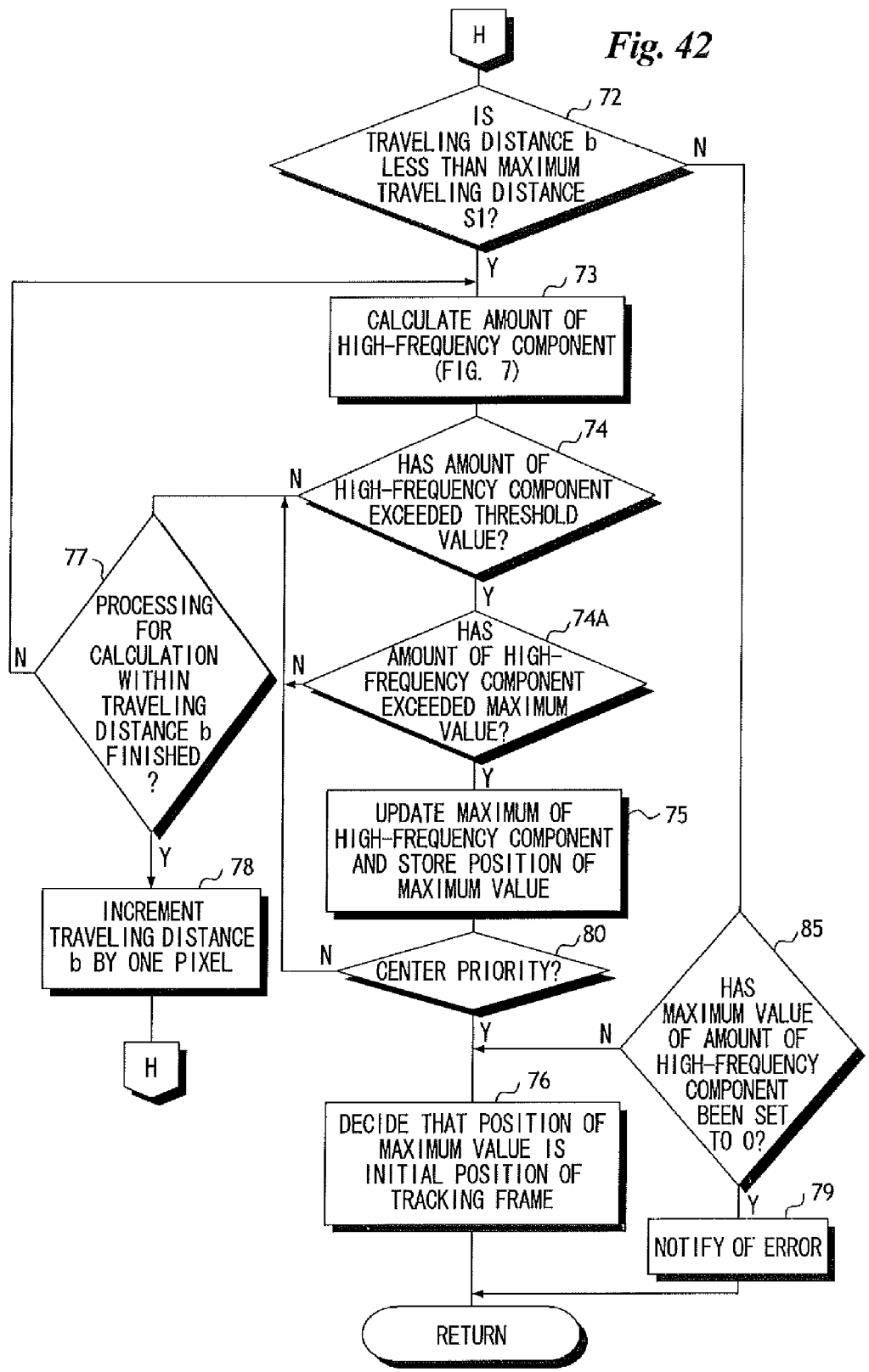
FIG. 42 is a flowchart illustrating a processing procedure for setting the initial position of a tracking frame.
Figure 43:
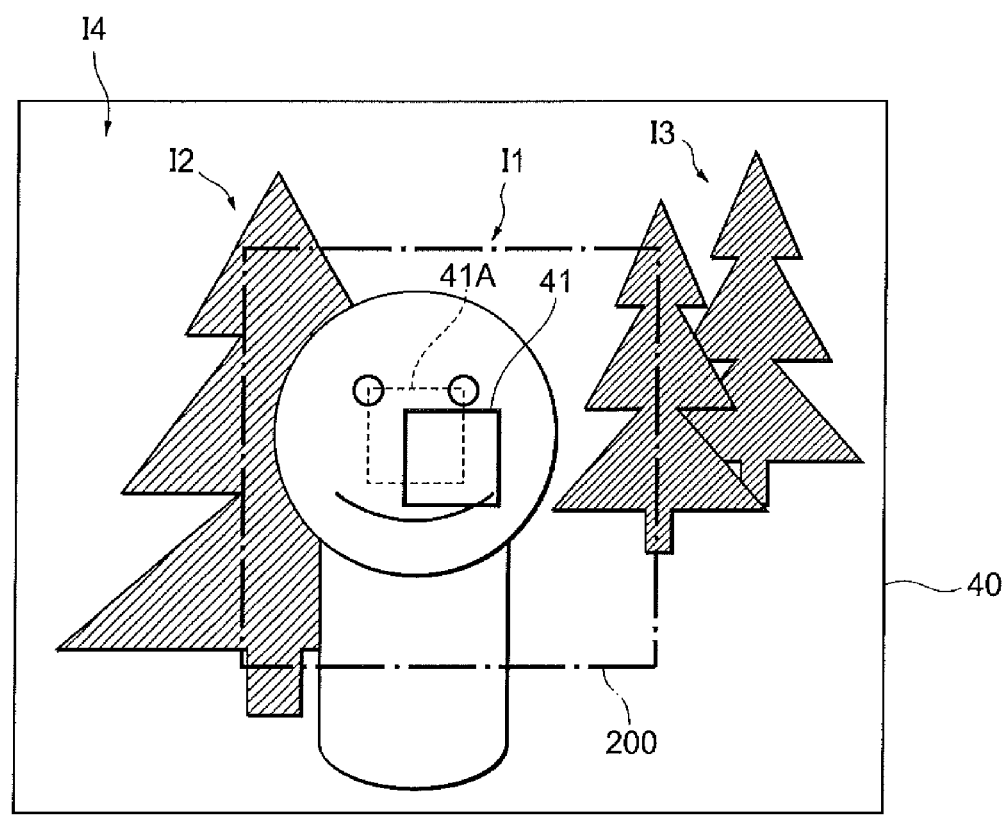
FIG. 43 is an example of a subject image.

FIGS. 41 to 43 illustrate another embodiment.

In the above-described embodiment, the initial position of the tracking frame 190 is a position decided in the manner set forth above, and the tracking frame 190 is first displayed at this initial position. Consequently, there are instances where the initial position of the tracking frame deviates from the position set by the user. In this embodiment, however, although the initial position of the tracking frame 190 is a position decided in the manner set forth above, the tracking frame is not displayed at this position; rather, a display frame is displayed at the position set by the user. An offset quantity between the position at which the display frame is displayed and the initial position of the tracking frame is calculated and the display frame is displayed by tracking processing upon shifting position by the amount of the calculated offset.

FIGS. 41 and 42 are flowcharts illustrating a processing procedure for setting the initial position of a tracking frame. Processing steps shown in FIGS. 41 and 42 identical with those shown in FIG. 24 are designated by like step numbers and a description thereof is omitted.

When the tracking frame is displayed at the reference position (step 30 in FIG. 41) and the target area for setting the initial position of the tracking frame is set (step 31 in FIG. 41), as described above, the offset quantity of the display-frame position is initialized (step 211 in FIG. 41), as described above. Thereafter, the processing from step 32 onward is executed in the manner described above.

When the initial position of the tracking frame is decided as described above, the offset quantity of the display-frame position, which represents the direction and size of the positional deviation between the reference position and the decided initial position, is calculated (step 212 in FIG. 42).

FIG. 43 illustrates the tracking frame 41, which is displayed at the reference position, and tracking frame 41A, which is displayed at the initial position that has been decided.

In this embodiment, the display frame 41 is displayed as the tracking frame at the reference position even though the initial position has been calculated in such a manner that the tracking frame 41A appears as illustrated.

Figure 44:
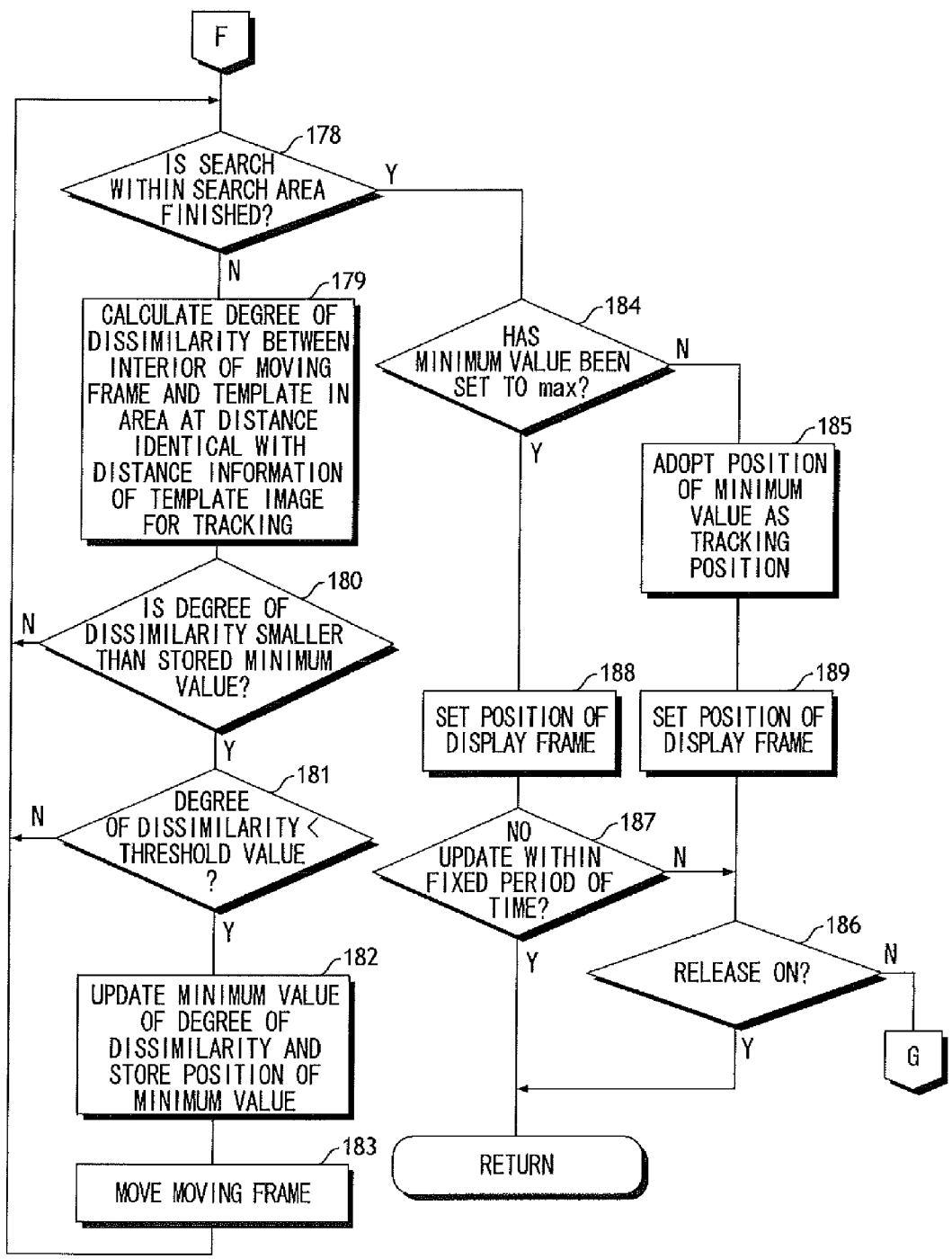
FIG. 44 is a flowchart illustrating part of an automatic tracking processing procedure.

FIG. 44 is a flowchart showing part of a tracking processing procedure. This flowchart corresponds to that shown in FIG. 37, and processing steps shown in FIG. 44 identical with those shown in FIG. 37 are designated by like step numbers and a description thereof is omitted.

As described above, degree of dissimilarity is calculated while the moving frame is moved within the search area IS (steps 178 to 183). If the minimum value of the degree of dissimilarity has not been set to max ("NO" at step 184), the position of his minimum value is adopted as the tracking position (step 185) but a position obtained by adding on the offset from this tracking position is adopted as the display position of the display frame (step 189). A frame is not displayed at the tracking position. Since the display frame is displayed at the portion set by the user, the user will not experience a sense of incongruity. Even if the position of the minimum value of degree of dissimilarity has been set at max ("YES" at step 184), the position obtained by adding on the offset from the calculated initial position will be the display position of the display frame (step 188).

Although tracking processing is executed using degree of dissimilarity in the above-described embodiment, it is also possible to execute tracking processing using degree of similarity. A cross-correlation coefficient $R_{NCC}$ can be utilized as the degree of similarity. The cross-correlation coefficient $R_{NCC}$ can be calculated from Equation 3. In a case where tracking processing is executed utilizing degree of similarity, the greater the degree of similarity, the greater the resemblance to the template image 191, unlike the case where degree of dissimilarity is used in the manner described above. Accordingly, instead of setting the minimum value of degree of dissimilarity to max and initializing the position of the minimum value at step 177 of FIG. 36, as described above, the maximum value of degree of similarity is set to min and the position of the maximum value is initialized, and instead of determining at step S180 whether the degree of dissimilarity is smaller than a minimum value that has been stored, it is determined whether the degree of similarity is larger than a maximum value that has been stored. Further, instead of determining whether the degree of dissimilarity is less than a threshold value at step 181 in FIG. 37, it is determined whether the degree of similarity is equal to or greater than a threshold value, and instead of updating the minimum value of degree of dissimilarity and storing the position of the minimum value at step 182 in FIG. 37, the maximum value of degree of similarity is updated and the position of the maximum value is stored. The position of the maximum value thus obtained becomes the tracking position.

$$R_{NCC} = \frac{\sum_{j=0}^{N-1} \sum_{i=0}^{M-1} I(i,j) - T(i,j)}{\sqrt{\sum_{j=0}^{N-1} \sum_{i=0}^{M-1} I(i,j)^2 \times \sum_{j=0}^{N-1} \sum_{i=0}^{M-1} (T(i,j)^2}} \quad \text{Equation 3}$$

Further, although the distance image 40A is utilized the above-described embodiment, the distance image 40A need not be generated; it will suffice it the distance to the subject is known.

The invention claimed is:

1. A tracking-frame initial-position setting device for specifying a target image, which is to be tracked, contained in a subject image obtained by imaging a subject continuously, comprising:

a display unit for displaying a subject image obtained by imaging;

a distance information generating device for generating distance information representing distance to a subject contained in an imaging zone or a distance value which is a value corresponding to this distance;

a tracking target decision device for deciding a target image to be tracked; and a decision device for calculating an amount of high-frequency component per prescribed area in an image portion, which is within the subject image obtained by imaging, representing a subject having a distance value identical with a value of distance to a subject represented by the target image to be tracked decided by said tracking target decision device, and deciding that the position of an area in which the calculated amount of high-frequency component is equal to or greater than a prescribed threshold value or is maximum is the initial position of the tracking frame.

2. A tracking-frame initial-position setting device according to claim 1, wherein said distance information generating device generates a distance image as distance information, the distance image being obtained from an amount of horizontal deviation of corresponding pixels between two subject images representing a subject from different viewpoints.

3. A tracking-frame initial-position setting device according to claim 1, further comprising a specific frequency component amount calculating device for moving a moving frame, in which is calculated an amount of high-frequency component of an image within the frame whenever the frame is moved in an image portion, which is within the subject image obtained by imaging, representing a subject having a distance value identical with a value of distance to a subject represented by the target image to be tracked decided by said tracking target decision device, and calculating the amount of high-frequency component of the image within the moving frame whenever the moving frame is moved;

wherein said decision device decides a position of the moving frame at which the amount of high-frequency component calculated by said specific frequency component amount calculating device is equal to or greater than a prescribed threshold value or is maximum is the initial position of the tracking frame.

4. A tracking-frame initial-position setting device according to claim 2, wherein said tracking target decision device decides that the target image to be tracked is an image designated by a user, an image of maximum area in an image portion representing an identical distance value in the distance information generated by said distance information generating device, an image of an area that includes the center of the imaging zone, or an image of an area representing a subject situated most forward.

5. A tracking-frame initial-position setting device according to claim 1, wherein the subject image obtained by imaging the subject continuously is a color image;

said device further comprising color component amount calculating device for calculating amount of component of a prescribed color component per said prescribed area;

said decision device deciding that the position of an area where the amount of component calculated by said color component amount calculating device is equal to or greater than a prescribed threshold value or is maximum is the initial position of the tracking frame.

6. A tracking-frame initial-position setting device according to claim 1, further comprising a first control device for controlling said decision device so as to calculate the amount of high-frequency component upon enlarging the size of the prescribed area in response to the amount of high-frequency component calculated by said specific frequency component amount calculating device failing to equal or exceed the prescribed threshold value.

7. A tracking-frame initial-position setting device according to claim 1, further comprising first control device for controlling said color component amount calculating device so as to execute processing, which is for calculating the amount of color component, upon enlarging the size of the prescribed area in response to the amount of color component calculated by the color component amount calculating device failing to equal or exceed the prescribed threshold value.

8. A tracking-frame initial-position setting device according to claim 6, further comprising an enlargement command device for applying a prescribed-area enlargement command;

wherein said first control device controls said decision device so as to calculate the amount of high-frequency component upon enlarging the size of the prescribed area in response to the enlargement command being applied from the enlargement command device and, moreover, the amount of high-frequency component calculated by the specific frequency component amount calculating device failing to equal or exceed the prescribed threshold value.

9. A tracking-frame initial-position setting device according to claim 7, further comprising an enlargement command device for applying a prescribed-area enlargement command;

wherein said first control device controls said color frequency component amount calculating device so as to execute processing, which is for calculating the amount of color component, upon enlarging the size of the prescribed area in response to the enlargement command being applied from said enlargement command device and, moreover, the amount of color component calculated by said color component amount calculating device failing to equal or exceed the prescribed threshold value.

10. A tracking-frame initial-position setting device according to claim 6, further comprising an enlargement ratio setting device for setting an enlargement ratio of a prescribed area;

wherein said first control device controls said decision device so as to calculate the amount of high-frequency component upon enlarging the size of the prescribed area in accordance with the enlargement ratio, which has been set by said enlargement ratio setting device, in response to the amount of high-frequency component calculated in said decision device failing to equal or exceed the prescribed threshold value.

11. A tracking-frame initial-position setting device according to claim 7, further comprising an enlargement ratio setting device for setting an enlargement ratio of a prescribed area;

wherein said first control device controls said color component amount calculating device so as to execute processing, which is for calculating the amount of color component, upon enlarging the size of the prescribed area in accordance with the enlargement ratio, which has been set by said enlargement ratio setting device, in response to the amount of color component calculated by said color component calculating device failing to equal or exceed the prescribed threshold value.

12. A tracking-frame initial-position setting device according to claim further comprising a second control device for controlling said decision device so as to calculate the amount of high-frequency component upon reducing the size of said subject image in response to the amount of high-frequency component calculated in said decision device failing to equal or exceed the prescribed threshold value.

13. A tracking-frame initial-position setting device according to claim 5, further comprising a third control device for controlling said color component amount calculating device so as to execute processing, which is for calculating the amount of color component, upon reducing the size of said subject image in response to the amount of color component calculated in said color component amount calculating device failing to equal or exceed the prescribed threshold value.

14. A tracking-frame initial-position setting device according to claim 1, further comprising a target area setting device for setting a target area having a size larger than a prescribed area and smaller than said subject image;
wherein said tracking target decision device decides upon a target image, which is to be tracked, within the target area set by said target area setting device.

15. A tracking-frame initial-position setting device according to claim 14, wherein said target area setting device sets the target area on said subject image in such a manner that the center of said subject image will coincide with the center of the target area; and
said specific frequency component amount calculating device moves said moving frame outward from the center of said target area and calculates the amount of high-frequency component of the image within the moving frame whenever the moving frame is moved.

16. A tracking-frame initial-position setting device according to claim 14, wherein said target area setting device sets the target area on said subject image in such a manner that the center of said subject image will coincide with the center of the target area; and
said color component amount calculating device moves the moving frame outward from said reference position and calculates the amount of component of the prescribed color component of the image within the moving frame whenever the moving frame is moved.

17. A tracking-frame initial-position setting device according to claim 3, wherein said specific frequency component amount calculating device moves said moving frame and calculates amount of low-frequency component, or amount of intermediate-frequency component from which high-frequency components have been eliminated, of the image within the moving frame whenever the moving frame is moved; and
said decision device decides that a position of the moving frame at which the amount of low-frequency component or amount of intermediate-frequency component calculated by said specific frequency component amount calculating device is equal to or greater than a prescribed threshold value is the initial position of the tracking frame.

18. A tracking-frame initial-position setting device according to claim 1, further comprising a noise reduction processing device for applying noise reduction processing to image data representing said subject image;
wherein said subject image represented by the image data that has been subjected to the noise reduction processing by said noise reduction processing device is subjected to processing by said decision device.

19. A tracking-frame initial-position setting device according to claim 1, further comprising a signal processing device for applying false-color or false-signal reduction processing to the image data representing said subject image;
wherein said subject image represented by the image data that has been subjected to the false-color or false-signal reduction processing by said signal processing device is subjected to processing by said decision device.

20. A tracking-frame initial-position setting device according to claim 1, further comprising a halt commanding device for applying a command that halts processing for deciding the initial position of the tracking frame;
wherein in response to application of the halt command from said halt commanding device, processing by said decision device is halted and said reference position is decided upon as the initial position of the tracking frame.

21. A tracking-frame initial-position setting device according to claim 1, wherein said specific frequency component amount calculating device moves the moving frame in such a manner that a proportion of inclusion of an image portion, which is within the subject image obtained by imaging, having a distance value identical with that of the target image to be tracked decided by said tracking target decision device will be equal to or greater than a prescribed proportion within the frame, and calculates the amount of high-frequency component of the image within the moving frame whenever the moving frame is moved.

22. A tracking-frame initial-position setting device according to claim 3, further comprising a mode setting device for setting a maximum-value priority setting mode or a center priority setting mode;
wherein in response to the maximum-value priority setting mode being set by said mode setting device, said decision device decides that the position of the moving frame at which the amount of high-frequency component calculated by said specific frequency component amount calculating device is maximized is the initial position of the tracking frame; and
in response to the center priority setting mode being set by said mode setting device, said frequency component amount calculating device moves said moving frame outwardly from the center of said subject image, calculates the amount of high-frequency component of the image within the moving frame whenever the moving frame is moved, and halts movement of the moving frame in response to the calculated amount of high-frequency component equaling or exceeding a prescribed threshold value.

23. A tracking-frame initial-position setting device according to claim 3, further comprising a tracking device for moving the tracking frame to an image portion, which is in the subject image obtained by imaging, identical with an image portion within the tracking frame in an image portion at a distance value identical with distance to a subject represented by an image portion within the tracking frame at a position decided by said decision device.

24. A tracking-frame initial-position setting device according to claim 1, further comprising a first display control device for controlling said display unit so as to display the tracking frame at the position decided by said tracking target decision device.

25. A tracking-frame initial-position setting device according to claim 23, further comprising:
an offset amount calculating device for calculating an offset amount representing amount of positional deviation between the initial position of the tracking frame decided by said decision device and the position decided by said tracking target decision device; and
a second display control device for controlling said display unit so as to display a display frame at a position that has been offset from the tracking frame, which is used in tracking by said tracking device, by the offset amount calculated by said offset amount calculating device.

26. A method of controlling operation of a tracking-frame initial-position setting device for specifying a target image, which is to be tracked, contained in a subject image obtained by imaging a subject continuously, comprising:

a display unit displaying a subject image obtained by imaging;

a distance information generating device generating distance information representing distance to a subject contained in an imaging zone or a distance value which is a value corresponding to this distance;

a tracking target decision device for deciding a target image to be tracked; and a decision device calculating an amount of high-frequency component per prescribed area in an image portion, which is within the subject image obtained by imaging, representing a subject having a distance value identical with a value of distance to a subject represented by the target image to be tracked decided by said tracking target decision device, and deciding that the position of an area in which the calculated amount of high-frequency component is equal to or greater than a prescribed threshold value or is maximum is the initial position of the tracking frame.

* * * * *